US008761129B2

(12) United States Patent
Prasad et al.

(10) Patent No.: US 8,761,129 B2
(45) Date of Patent: Jun. 24, 2014

(54) ENHANCEMENT OF DOWNLOAD MULTI-USER MULTIPLE-INPUT MULTIPLE-OUTPUT WIRELESS COMMUNICATIONS

(75) Inventors: Narayan Prasad, Wyncote, PA (US);
Guosen Yue, Plainsboro, NJ (US);
Meilong Jiang, Plainsboro, NJ (US);
Mohammad A. Khojastepour, Lawrenceville, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 146 days.

(21) Appl. No.: 13/456,845

(22) Filed: Apr. 26, 2012

(65) Prior Publication Data

US 2012/0275313 A1  Nov. 1, 2012

Related U.S. Application Data

(60) Provisional application No. 61/480,690, filed on Apr. 29, 2011, provisional application No. 61/543,591, filed on Oct. 5, 2011, provisional application No. 61/556,560, filed on Nov. 7, 2011.

(51) Int. Cl.
*H04B 7/216* (2006.01)

(52) U.S. Cl.
USPC ........................................ 370/335

(58) Field of Classification Search
USPC .......................... 370/208–210, 328–339, 365
See application file for complete search history.

(56) References Cited

U.S. PATENT DOCUMENTS

| 8,446,971 B2 * | 5/2013 | Li et al. ...................... 375/260 |
| 2007/0242770 A1 | 10/2007 | Kim et al. |
| 2008/0132281 A1 * | 6/2008 | Kim et al. .................. 455/562.1 |
| 2010/0020757 A1 | 1/2010 | Walton et al. |
| 2010/0254335 A1 | 10/2010 | Koo et al. |
| 2011/0069629 A1 | 3/2011 | Breit et al. |
| 2012/0082042 A1 * | 4/2012 | Lunttila et al. ............... 370/252 |
| 2012/0270535 A1 * | 10/2012 | Chen et al. ................. 455/422.1 |

OTHER PUBLICATIONS

Yue et al, Residual Error Based CSI Feedback Enhancement for Downlink Multiuser MIMO, IEEE, 6 pages, 2013.*
Alcatel-Lucent, Alcatel-Lucent Shanghai Bell, AT&T, ETRI, Icera Inc., LG Electronics, Marvell, NEC, New Postcom, Pantech, Qualcomm, RIM, Samsung, Texas Instruments,"Way Forward on CQI/PMI reporting enhancement on PUSCH 3-1 for 2, 4 and 8 TX," 3GPP TSG RAN WG1 R1-105801 62bis, Xian, China, Oct. 2010.

* cited by examiner

*Primary Examiner* — Frank Duong
(74) *Attorney, Agent, or Firm* — Akitaka Kimura

(57) ABSTRACT

A method implemented in a user equipment configured to be used in a multi-user (MU) multiple-input multiple-output (MIMO) wireless communications system is disclosed. In an aspect, the user equipment transmits to a base station a first channel state information (CSI) report determined according to a single-user (SU) MIMO rule and a second CSI report based on a residual error.

17 Claims, 4 Drawing Sheets

ENHANCEMENT OF DOWNLOAD MULTI-USER MULTIPLE-INPUT MULTIPLE-OUTPUT WIRELESS COMMUNICATIONS

This application claims the benefit of U.S. Provisional Application No. 61/480,690, entitled, "Enhancements to DL MU-MIMO," filed Apr. 29, 2011, U.S. Provisional Application No. 61/543,591, entitled, "Enhancements to DL MU-MEMO," filed Oct. 5, 2011, and U.S. Provisional Application No. 61/556,560, entitled, "DL MU-MIMO Enhancement via Residual Error Norm Feedback," filed Nov. 7, 2011, of which the contents of all are incorporated herein by reference.

BACKGROUND OF THE INVENTION

The present invention relates to wireless communications system and more particularly to multi-user (MU) multiple-input multiple-output (MIMO) wireless communications system.

The present invention considers the problem of designing efficient channel state information (CSI) feedback schemes in order to allow improved multi-user multi-input multi-output resource allocation at a base-station (BS), resulting in increased system spectral efficiency. A cell in which multiple users feedback CSI and the BS performs MU-MIMO resource allocation is depicted in FIG. 1.

Referring to FIG. 1, user terminals 110, e.g. users 1 (111) to K (119), send quantized channel feedbacks 120 to base station 130. At base station 130, DL (downlink) MU-MEMO resource allocation 140 is performed according to quantized channel feedbacks 120 and streams, e.g. user 1 stream 151 to user K stream 159, are subjected to RB (resource block) and/or MCS (modulation and coding scheme) allocation and transmit precoding 160. Signals are transmitted via $n_T$ antennas from base station 130 and received by $n_R$ antennas, for example, at user 1 (111).

Note that the quality of resource allocation done by the BS depends on the accuracy of each user's CSI report. On the other hand, allowing a very accurate CSI feedback can result in a large signaling overhead. The key challenges that need to be overcome before spectral efficiency gains from MU-MIMO can realized are, for example, as follows:
  Improving CSI accuracy without a large signaling overhead, or
  Exploiting the enhanced CSI reports at the BS in an efficient manner.

In order to solve the above problem, others have proposed various solutions, such as increasing CSI feedback overhead; CSI feedback under assumptions on BS scheduling; and complex algorithms for joint scheduling.

CQI (Channel Quality Indicator)/PMI (Precoding Matrix Indicator) reporting enhancements targeting DL MU-MIMO operations on PUSCH 3-1 as well as PUSCH 3-2 were considered by several companies [1]. The proposed enhancement to PUSCH 3-2 comprised enabling sub-band PMI reporting in addition to the sub-band CQI reporting. On the other hand, enhancements to PUSCH 3-1 that were considered suggested that in addition to 3rd Generation Partnership Project (3GPP) Release (Rel-) 8 Mode 3-1 feedback, a user equipment (UE) can be configured via higher layer signalling to report as follows:
  A wideband PMI calculated assuming restricted rank equal to one, along with a per subband CQI targeting MU-MIMO operation.
  The MU-MIMO CQI is computed assuming the interfering PMIs are orthogonal to the single-user (SU) MIMO rank 1 PMI and for 4 TX, the total number of co-scheduled layers is assumed to be 4 at the time of MU CQI computation [1].

We propose a broad framework for enhanced CSI reporting by the users in order to obtain an improvement in MU-MIMO performance. We also illustrate mechanisms using which the eNodeB (eNB) can exploit such enhanced CSI feedback. System level simulations show that a simple form of enhanced feedback results in substantial system throughput improvements in homogenous networks and more modest improvements over heterogeneous networks.

[1] Alcatel-Lucent, Alcatel-Lucent Shanghai Bell, AT&T, ETRI, Icera Inc., LG Electronics, Marvell, NEC, New Postcom, Pantech, Qualcomm, RIM, Samsung, Texas Instruments,"Way Forward on CQI/PMI reporting enhancement on PUSCH 3-1 for 2, 4 and 8 TX," 3GPP TSG RAN WG1 R1-105801 62bis, Xian, China, October 2010.

BRIEF SUMMARY OF THE INVENTION

An objective of the present invention is to achieve a high spectral efficiency, for example, even around a cell edge in an MU-MIMO wireless communications system.

An aspect of the present invention includes a method implemented in a user equipment configured to be used in a multi-user (MU) multiple-input multiple-output (MIMO) wireless communications system, comprising: transmitting to a base station a first channel state information (CSI) report determined according to a single-user (SU) MIMO rule; and transmitting to the base station a second CSI report based on a residual error.

Another aspect of the present invention includes a method implemented in a base station configured to be used in a multi-user (MU) multiple-input multiple-output (MIMO) wireless communications system, comprising: receiving from a user equipment a first channel state information (CSI) report determined according to a single-user (SU) MIMO rule; and receiving from the user equipment a second CSI report based on a residual error.

Still another aspect of the present invention includes a multi-user (MU) multiple-input multiple-output (MEMO) wireless communications system, comprising: a base station; and a user equipment, wherein the user equipment transmits to the base station a first channel state information (CSI) report determined according to a single-user (SU) MEMO rule, and a second CSI report based on a residual error.

DETAILED DESCRIPTION

Figure 1:
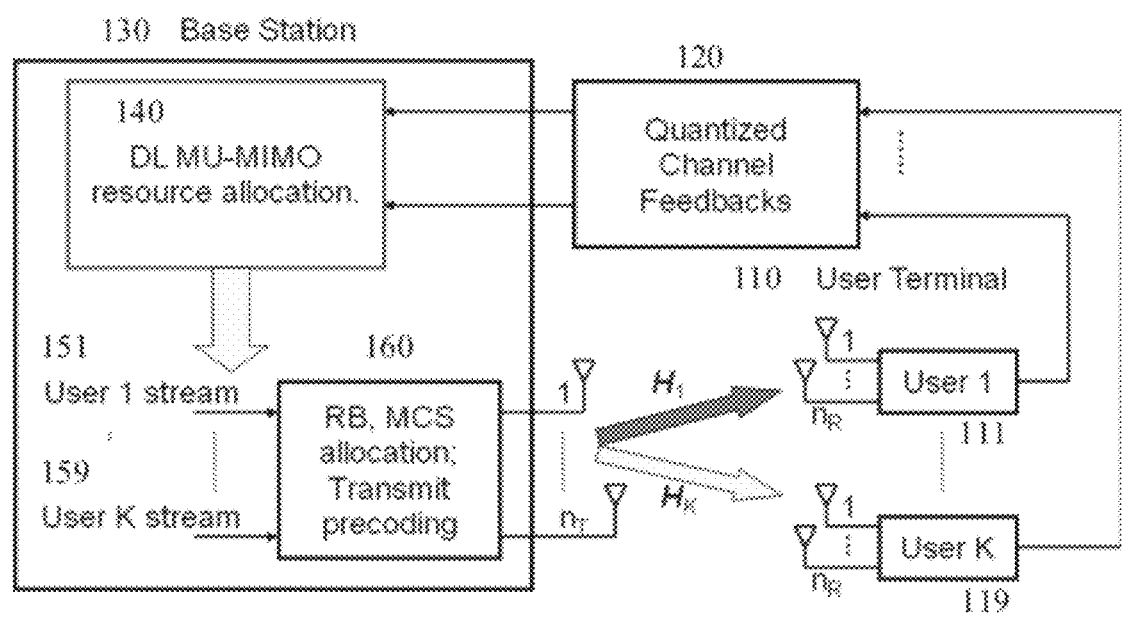
FIG. 1 depicts an illustrative diagram for CSI feedback.

We consider a downlink comprising K users and multiple orthogonal RBs that are available in each scheduling interval. We first model the actual received signal vector that the user will see on a representative resource element in an RB, if it is scheduled on that RB, as $$y_1 = H_1 * U_1 s_1 + H_1 * U_{\bar{1}} s_{\bar{1}} + \eta_1 \qquad (1)$$

where $y_1$ represents the N×1 received signal vector on an RB (N being the number of receive antennas) and $H_1$ represents the M×N channel matrix (M being the number of transmit antennas) with $H_1^*$ denoting its Hermitian. $U_1$ and $U_T$ represent the transmit precoding matrices used by the BS to transmit data to user-1 and the other co-scheduled users (or user equipments), respectively, and $s_1$ and $s_T$ represent the transmit symbol vectors intended for user-1 and the other co-scheduled users, respectively. Finally $\eta_1$ represents the additive noise vector. Note that under MU-MIMO transmission on that RB $U_T$ will be a non-zero matrix whereas under SU-MIMO transmission on that RB $U_T$ will be a zero matrix.

The model in equation (1) is the model in the aftermath of scheduling. The scheduling which involves RB, MCS and transmit precoder allocation by the BS is done by the BS scheduler whose input is the quantized CSI (referred to henceforth as just CSI) fed back by the users.

The conventional procedure employed by the users to report CSI is to compute a rank indicator (RI), precoding matrix indicator (PM I), which together determine a precoder from a quantization codebook, along with up-to 2 channel quality indicators or indices (CQI(s)). Note that the columns of the selected precoder represent a set of preferred channel directions and the CQI(s) represent quantized SINRs (signal to interference plus noise ratios). Further, for a rank R precoder, R SINRs (one for each column) can be recovered from the up-to 2 CQI(s). More importantly, this CSI is computed by the user using SU-MIMO rules, i.e., after assuming that it alone will be scheduled on an RB. Such CSI is referred to here as SU-CSI.

Clearly, if the BS wants to do MU-MIMO transmissions on an RB then it may, modify the SU-CSI reported by the users in order to do proper MCS assignment and RB allocation. However, even after such modifications MU-MIMO performance is degraded due to a large mismatch between UE reported SU-CSI and the actual channel conditions that UE will see on an RB with MU-MIMO transmissions.

In order to address this problem we propose enhanced CSI feedback along with a finer model that can exploit the enhanced CSI feedback report and can be used for better MU-MIMO resource allocation at the BS. The finer model, a post scheduling model, can be given by, but not restricted to, $$y_1 = \hat{D}_1^{1/2} \hat{V}_1^\dagger U_1 s_1 + \hat{D}_1^{1/2}(\hat{V}_1^\dagger + R_1^\dagger Q_1^\dagger) U_T s_T + \eta_1 \quad (2)$$

where $\hat{D}_1^{1/2}$ is a diagonal matrix of effective channel gains, $\hat{V}_1$ denotes a semi-unitary matrix whose columns represent preferred channel directions, $Q_1$ is a semi-unitary matrix whose columns lie in the orthogonal complement of $\hat{V}_1$, i.e. $Q_1^\dagger \hat{V}_1 = 0$, and $R_1$ is a matrix which satisfies the Frobenius-norm constraint it $\|R_1\|_F^2 \leq \epsilon_1^{12}$ for some $\epsilon_1 > 0$.

MU-CQI reporting: The UE is configured to also report additional CQI computed using MU-MIMO rules and possibly an additional PMI. To compute MU-CQI corresponding to a precoder $\hat{G}_1$, the UE assumes a post-scheduling model as in equation (2) in which $\hat{D}_1^{1/2}, \hat{V}_1$ are equal to the diagonal matrix of the dominant unquantized singular values and the dominant unquantized right singular vectors, respectively, of its downlink channel matrix. It sets $U_1 = \hat{G}_1$ and assumes that the columns of U_T are isotropically distributed in the subspace defined by $I - \hat{G}_1 \hat{G}_1^\dagger$ (orthogonal complement of $\hat{G}_1$). In addition it assumes $Q_1 = 0$ which is reasonable in this case since $\hat{V}_1$ is taken to contain all the unquantized dominant singular vectors so no significant interference can be received from signals in its orthogonal complement. Then, to compute MU-SINRs the UE can be configured to assume a particular number of columns in $U_T$ and either an equal power per scheduled stream or a non-uniform power allocation in which a certain fraction of energy per resource element energy per resource element (EPRE) is shared equally among columns of $U_T$ with another fraction (possibly the remaining fraction) being shared equally among columns in $U_T$.

Enhanced CSI reporting (SU-MIMO CSI and residual error): The UE can be configured for enhanced CSI reporting. Suppose that using SU-MIMO rules the UE determined a precoder $\hat{G}_1$ of a preferred rank $r_1$ and the corresponding quantized SINRs $\{S\hat{I}NR_1^i\}_{i=1}^{r_1}$. In order to determine the residual error, the UE assumes a post-scheduling model as in equation (2) in which $$\hat{D}_1 = \frac{r_1}{\rho_1} \text{diag}\{S\hat{I}NR_1^1, \ldots, S\hat{I}NR_1^{r_1}\}$$

and $\hat{V}_1 = \hat{G}^1$. Then let $P_1^\perp = I - \hat{G}_1 \hat{G}_1^\dagger$ denote the projection matrix whose range is the orthogonal complement of $\hat{G}_1$. Let us refer to the matrix $E_1 \triangleq Q_1 R_1$ as the (normalized) residual error matrix and the matrix $C_1 = E_1^\dagger E_1$ as the residual error correlation matrix and note that $C_1 = \hat{D}_1^{-1/2} F_1 H_1^\dagger P_1^\perp H_1 F_1^\dagger \hat{D}_1^{-1/2}$. The UE can be configured to report some approximation of either the residual error matrix or the residual error correlation matrix. These include:

Quantizing and reporting the dominant diagonal values of R1 along with the corresponding columns in $Q_1$.

Quantizing and reporting the diagonal values of $C_1$

Quantizing and reporting the trace of $C_1$, $\epsilon_1^2 = tr(C_1) = tr(F_1 H_1^\dagger P_1^\perp H_1 F_1^\dagger \hat{D}_1^{-1})$ which can be thought of as the normalized total residual error.

The BS can configure the user to report a particular enhanced feedback form. A simple example of the enhanced feedback form is the residual error norm, $$\epsilon_1 = \sqrt{tr(F_1 H_1^\dagger P_1 H_1 F_1^\dagger \hat{D}_1^{-1})} \quad (3)$$

where tr(.) denotes the trace operation, $F_1 H_1^\dagger$ denotes the filtered user channel, and $P_1 = (I - \hat{V}_1 \hat{V}_1^\dagger)$ is a projection matrix. PMI $\hat{V}_1$ of some rank $r_1$ and $r_1$ quantized SINRs $\{S\hat{I}NR_1^i\}_{i=1}^{r_1}$ are determined using SU-MIMO rules $\hat{D}_1 = \text{diag}\{S\hat{I}NR_1^1, \ldots, S\hat{I}N_1^{r_1}\}$. Various other forms for the enhanced feedback and various other norms for the residual error can apply to the enhanced feedback.

We list several flow diagrams that describe aspects of the invention. In each figure, the flow diagram describes the operations that are conducted at a user-terminal. The operations are enabled by signaling from the eNB (or base-station) certain parameters on a downlink (feed-forward) control channel that are then received as inputs by the user. The feed-back is sent by the user on an uplink (feed-back) control channel and is received by the eNB. The parameters signaled by the base-station to a user may be interpreted by that user in a particular way that is described in detail in the further system details. Moreover, wherever applicable, the feedback sent by the user may allow the eNB to unambiguously determine the portion of the feedback determined by the user as SU-CSI and the portion determined as per the enhanced feedback form.

In each channel state information (CSI) reporting interval the user reports its CSI. The BS (or eNB) can configure a user for periodic CSI reporting and fix the periodicity and offset which together determine the exact sequence of intervals for which the user may report its CSI. This sequence will be henceforth referred to as the sequence for CSI reporting.

The user equipment can transmit to the base station an SU-CSI feedback and an enhanced CSI feedback, which are received by the base station. The transmission and the reception can be performed in a various ways as follows:

1. Multiplexing SU-CSI and Enhanced Feedback

In order to obtain the benefits of accurate MU-MIMO resource allocation without excessive feedback overhead, the eNB can multiplex intervals in which the user reports enhanced feedback with the ones in which it reports its SU-CSI feedback without enhanced feedback. The periodicity and offset of the sub-sequence formed by intervals designated for enhanced feedback within the sequence for CSI reporting can be configured by the eNB, based on factors such as user mobility.

Figure 2:
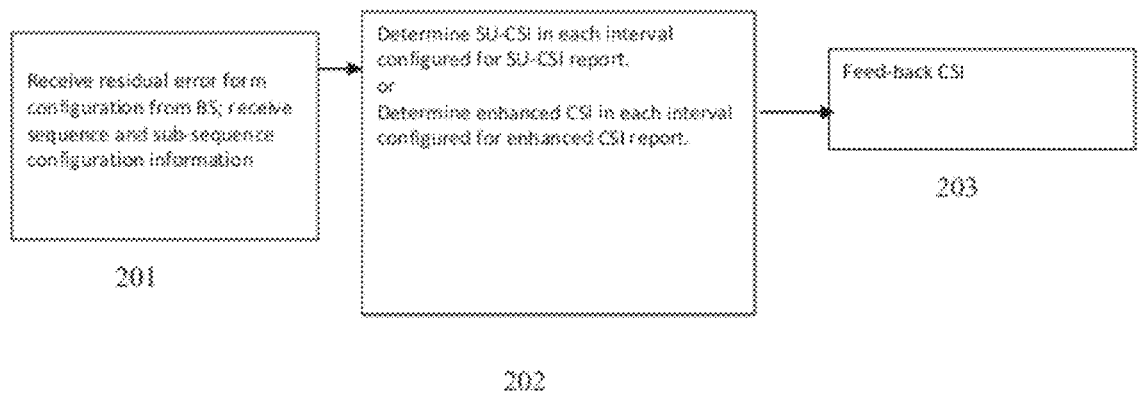
FIG. 2 depicts an illustrative diagram for multiplexing SU-CSI and enhanced feedback.

As shown in FIG. 2, at step 201, a UE receives residual error form configuration from a BS and receives also sequence and sub-sequence configuration information. Next, at step 202, the UE determines SU-CSI in each interval configured for SU-CSI report or determines enhanced CSI in each interval configured for enhanced CSI report. Then, at step 203, the UE feeds back the CSI to the BS.

Several ways of further reducing enhanced CSI feedback are described in the further system details. These include, for instance, letting the precoder used for computing the enhanced CSI be a function of previously reported precoder(s) contained in SU-CSI reports and/or reporting one or more components in the enhanced CSI feedback in a wideband fashion and/or reporting one or more components in the enhanced CSI feedback in a differential fashion.

2. Combining SU-CSI and Enhanced Feedback

In the second class of feedback schemes, the user combines SU-MIMO CSI report and enhanced CSI report and feeds them back in each interval.

Figure 3:
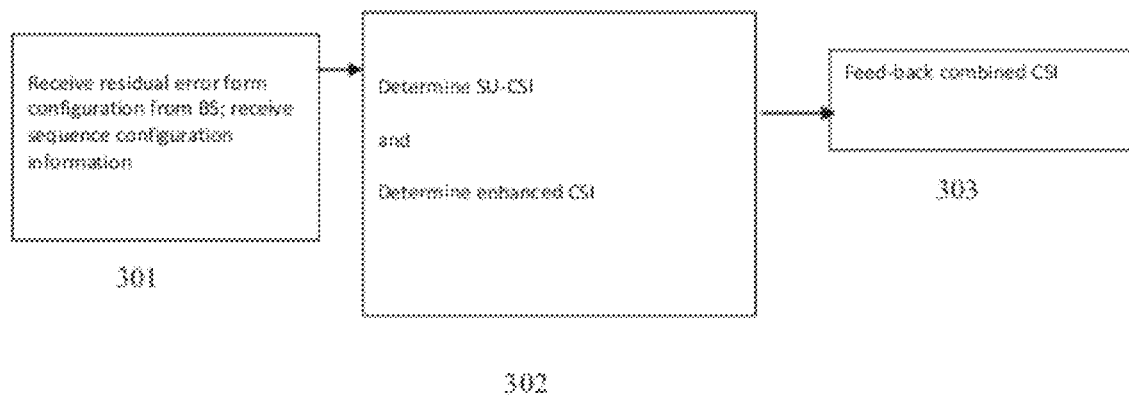
FIG. 3 depicts an illustrative diagram for combining SU-CSI and enhanced feedback.

As shown in FIG. 3, at step 301, a UE receives residual error form configuration from a BS and receives also sequence and sub-sequence configuration information. Next, at step 302, the UE determines in each interval configured for CSI report SU-CSI and enhanced CSI. Then, at step 303, the UE feeds back combined CSI to the BS.

Methods of further reducing enhanced CIT feedback overhead are described in the further system details. These include, for instance, letting the precoder used for computing the enhanced CSI be a function of the precoder computed for SU-CSI report and/or reporting one or more components in the enhanced CSI feedback in a wideband fashion and/or reporting one or more components in the enhanced CSI feedback in a differential fashion.

3. Multiplexing SU-CSI and Combined CSI Feedback

Figure 4:
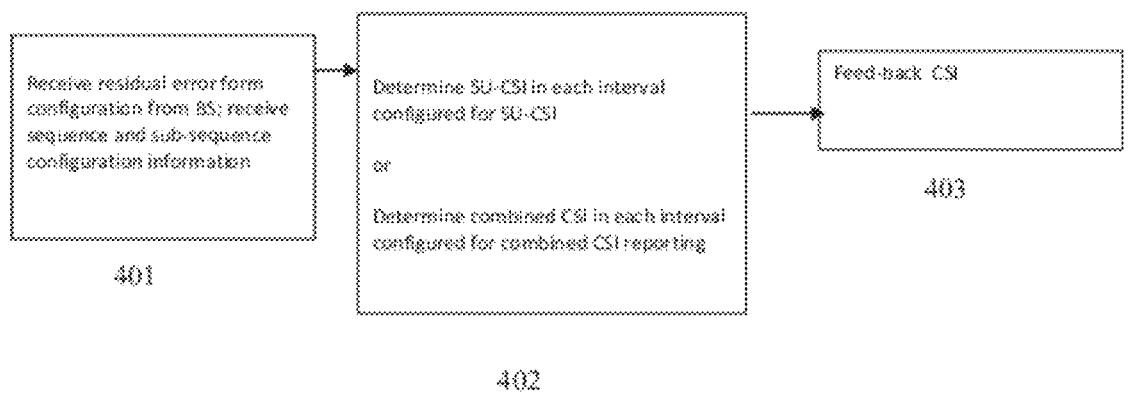
FIG. 4 depicts an illustrative diagram for multiplexing SU-CSI and combined CSI feedback.

FIG. 4 shows another method of CSI reporting. At step 401, a UE receives residual error form configuration from a BS and receives also sequence and sub-sequence configuration information. Next, at step 402, the UE determines SU-CSI in each interval configured for SU-CSI report or determines combined CSI for combined CSI reporting. Then, at step 403, the UE feeds back CSI to the BS.

In FIGS. 2, 3, and 4, the sequence information includes, for example, periodicity and offset for the SU CSI reporting and the sub-sequence configuration information includes, for example, periodicity and offset for the enhanced CSI reporting. For example, the enhanced CSI report includes any indication, such as a quantized value, of the residual error matrix or the residual error correlation matrix.

FIGS. 2, 3, and 4 may apply to MU-CQI reporting as well.

In conclusion, we considered enhancements to the MU-MIMO operation by enhancing the user CSI reporting which enables more accurate MU-MIMO SINR computation at the eNB and by a finer modeling of the received output seen by a user in the aftermath of scheduling. Our results using a simple form of enhanced feedback show substantial system throughput improvements in homogenous networks and improvements also in heterogeneous networks. One important feature of the gains obtained is that they are quite robust in the sense that they are not dependent on an effective outer loop link adaptation (OLLA) implementation.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

Further System Details A

1 Enhanced MU-MIMO Operation

The key hurdle that needs to be overcome in order to realize optimal MU-MIMO gains is the difficulty in modeling the received channel output seen by a user post-scheduling. The user has an un-quantized estimate of its downlink channel but does not know the transmit precoder that will be employed by the base-station. On the other hand, the base station is free to select any transmit precoder but has to rely on the quantized CSI reported by the active users. We first consider a simple (baseline) approach for modeling the received output seen by a user of interest (say user-1) post, scheduling. Such an approach is quite popular in MU-MIMO studies. Here, essentially the received output seen by user-1 post-scheduling is modeled as $$y_1 = \hat{D}_1^{1/2} \hat{V}_1^\dagger U_1 s_1 + \hat{D}_1^{1/2} \hat{V}_1^\dagger U_T s_T + \eta_1, \quad (A1)$$

where $\eta_1 \sim CN(0, I)$ is the additive noise. $U_1$ contains columns of the transmit precoder along which symbols to user-1 are sent whereas $U_T$ contains all the remaining columns used for the co-scheduled streams. $\hat{D}_1^{1/2}$ is a diagonal matrix of effective channel gains and $\hat{V}_1$ is a semi-unitary matrix whose columns represent the preferred channel directions.

Under SU-MIMO CSI reporting rules, the UE assumes a post-scheduling model as in (A1) where the matrix $U_1 = 0$ and $\hat{D}_1^{1/2}, \hat{V}_1$ are equal to the diagonal matrix of the un-quantized dominant singular values and the unquantized dominant right, singular vectors, respectively, of its downlink channel matrix $H_1^\dagger$. In other words, the UE assumes that there will be no other users co-scheduled with it on its allocated resource blocks. The UE then determines a precoder $\hat{G}_1$ of a preferred rank $r_1$ and reports the corresponding quantized SINRs $\{S\hat{I}NR_1^i\}_{i=1}^{r_1}$ as CQIs.[A1] The understanding is that if the base station selects a transmit precoder such that $U_T = 0$ and $$U_1 = \frac{\rho_1}{r_1} \hat{G}_1,$$

where $\rho_1$ is the EPRE configured for the UE-1, then the effective SINR seen by the UE (after filtering using a filter $F_1$ to remove interference among columns of $U_1$) for the $i^{th}$ column of $U_1$ will be $S\hat{I}NR_1^i$.

[A1]Note that when $r_1 \geq 2$ the SINRs are combined into two CQIs.

On the other hand, at the base station end we construct a model as in (A1) using the CQI(s) and PMI reported by user 1. The CQI(s) are first mapped back to $\{S\hat{I}NR_1^i\}_{i=1}^{r_1}$. Then we set $\hat{V}_1 = \hat{G}_1$, and the matrix $\hat{D}_1$ to be $$\frac{r_1}{\rho_1}\text{diag}\{SI\hat{N}R_1^1, \ldots, SI\hat{N}R_1^{r_1}\}.$$

Letting $A=[U_1, U_T]$ denote the transmit precoding matrix, with rank $(U_1)=r'_1 \leq r_1$, the base-station can obtain the following approximation for the SINRs seen by user-1 post-scheduling.

$$si\hat{n}r_1^i = \frac{\hat{\alpha}_1^i}{1-\hat{\alpha}_1^i}, \quad (A2)$$

$$\hat{\alpha}_1^i = \left[(I+A^\dagger \hat{S}_1 A)^{-1} A^\dagger \hat{S}_1 A\right]_{i,i}, \quad 1 \leq i \leq r'_1,$$

where $\hat{S}_1 \triangleq \hat{G}_1 \hat{D}_1 \hat{G}_1^\dagger$. Since this SINR approximation is obtained by ignoring the component of the user channel that lies in the orthogonal complement of $\hat{G}_1$, it is an over-estimation and can in-fact degrade system performance without appropriate compensation.

Next, consider a finer modeling more tuned to MU-AMMO operation. Here, we assume that the channel output seen by user-1 post-scheduling can be modeled as $$y_1 = \hat{D}_1^{1/2} \hat{V}_1^\dagger U_1 s_1 + \hat{D}_1^{1/2} (\hat{V}_1^\dagger + R_1^\dagger Q_1^\dagger) U_T + \eta_1. \quad (A3)$$

where $Q_1$ is a semi-unitary matrix whose columns lie in the orthogonal complement of $\hat{V}_1$, i.e. $Q_1^\dagger \hat{V}_1 = 0$ and $R_1$ is a matrix which satisfies the Frobenius-norm constraint $\|R_1\|_F^2 \leq \epsilon_1^2$, for some $\epsilon_1 > 0$. Note that the model in (A3) makes the reasonable assumption that $U_1$ lies in the span of $\hat{V}_1$ whose columns represent the preferred directions along which the UE wishes to receive its intended signal. In addition, the model in (A3) accounts for the fact that the component of $U_T$ in the orthogonal complement of $\hat{V}_1$ can also cause interference to the UE.

Let us first consider UE side operations after assuming a post-scheduling model as in (A3). In order to determine the SU-MIMO CSI reports the UE assumes a post-scheduling model as in (A3) in which $U_T = 0$ and the matrices $\hat{D}_1^{1/2}, \hat{V}_1$ are equal to the diagonal matrix of the dominant unquantized singular values and the dominant unquantized right singular vectors, respectively, of its downlink channel matrix $H_1^\dagger$. Note that models (A1) and (A3) are equivalent in terms of UE SU-MIMO CSI reporting. On top of SU-MIMO CSI reports, there are alternatives for configuring the UE to report more CSI. These include:

MU-CQI reporting: The UE is configured to also report additional CQI computed using MU-MIMO rules and possibly an additional PMI. To compute MU-CQI corresponding to a precoder $\hat{G}_1$, the UE assumes a post-scheduling model as in (A3) in which $\hat{D}_1^{1/2}, \hat{V}_1$ are equal to the diagonal matrix of the dominant unquantized singular values and the dominant unquantized right singular vectors, respectively, of its downlink channel matrix. It sets $U_1 = \hat{G}_1$ and assumes that the columns of $U_T$ are isotropically distributed in the subspace defined by $I - \hat{G}_1 \hat{G}_1^\dagger$ (orthogonal complement of $\hat{G}_1$). In addition it assumes $Q_1 = 0$ which is reasonable in this case since $\hat{V}_1$ is taken to contain all the unquantized dominant singular vectors so no significant interference can be received from signals in its orthogonal complement. Then, to compute MU-SINRs the UE can be configured to assume a particular number of columns in $U_T$ and either an equal power per scheduled stream or a non-uniform power allocation in which a certain fraction of EPRE is shared equally among all columns of $U_T$ with the remaining fraction being shared equally among all columns in $U_1$.

Enhanced CSI reporting (SU-MIMO CSI and residual error): The UE can be configured for enhanced CSI reporting. Suppose that using SU-MIMO rules the UE determined a precoder $\hat{G}_1$ of a preferred rank $r_1$ and the corresponding quantized SINRs $\{SI\hat{N}R_1^i\}_{i=1}^{r_1}$. In order to determine the residual error, the UE assumes a post-scheduling model as in (A3) in which $$\hat{D}_1 = \frac{r_1}{\rho_1}\text{diag}\{SI\hat{N}R_1^1, \ldots, SI\hat{N}R_1^{r_1}\}$$

and $\hat{V}_1 = \hat{G}_1$. Then let $P_1^\perp = I - \hat{G}_1 \hat{G}_1^\dagger$ denote the projection matrix whose range is the orthogonal complement of $\hat{G}_1$. Let us refer to the matrix $E_1 \triangleq Q_1 R_1$ as the (normalized) residual error matrix and the matrix $C_1 = E_1^\dagger E_1$ as the residual error correlation matrix and note that $C_1 = \hat{D}_1^{-1/2} F_1 H_1^\dagger P_1^\perp H_1 F_1^\dagger \hat{D}_1^{-1/2}$. The UE can be configured to report some approximation of either the residual error matrix or the residual error correlation matrix. These include:

Quantizing and reporting the dominant diagonal values of $R_1$ along with the corresponding columns in $Q_1$.

Quantizing and reporting the diagonal values of $C_1$

Quantizing and reporting only the trace of $C_1$, $\epsilon_1^2 = \text{tr}(C_1) = \text{tr}(F_1 H_1^\dagger P_1^\perp H_1 F_1^\dagger \hat{D}_1^{-1})$ which can be thought of as the normalized total residual error.

Let us consider the possible eNB (a.k.a base station) side operations which involve the model in (A3), i.e. at-least one of the following two cases holds true: The UE reports some CSI assuming a post-scheduling model as in (A3) or the eNB assumes a post-scheduling model as in (A3) for SINR approximation in the case of UE pairing.

We first illustrate one instance of how the base station can utilize the model in (A3) along with the enhanced CSI UE report in which the user feedsback SU CSI report along with the normalized total residual error $\epsilon_1^2$. Further, for simplicity let us assume that the base station considers the practically important MU-MIMO configuration, which is co-scheduling a user-pair with one stream per-user so that both $U_1 = u_1$ and $U_T = u_T$ are rank-1 vectors. Suppose that the UE 1 reports the SU-MIMO PMI $\hat{G}_1$ of rank $r_1$ and CQI(s) (which are mapped to the SINRs $\{SI\hat{N}R_1^1, \ldots, SI\hat{N}R_1^{r_1}\}$), along with the normalized total residual error $\epsilon_1^2$. Then using the model in (A3), at the base station end we set $\hat{V}_1 = \hat{G}_1$ and the matrix $\hat{D}_1$ to be $$\frac{r_1}{\rho_1}\text{diag}\{SI\hat{N}R_1^1, \ldots, SI\hat{N}R_1^{r_1}\}.$$

Note that now $R_1$ is not known (except for the fact that $\text{tr}(R_1^\dagger R_1) = \epsilon_1^2$) and $Q_1$ is known to lie in the subspace determined by $I - \hat{G}_1 \hat{G}_1^\dagger$. Without loss of generality, we can assume Q to be a deterministic $M \times (M-r_1)$ semi-unitary matrix whose columns are the basis of the orthogonal complement of $G_1$. To obtain a conservative SINR estimate the base station can assume that the UE employs a simple MRC receiver, i.e., user-1 is assumed to use the linear combiner $u_1^\dagger \hat{G}_1 \hat{D}_1^{1/2}$ on the model in (A3). In addition, we compute the worst-case SINR, obtained by minimizing the SINR over all choices of $(M-r_1) \times r_1$ matrices $R_1$ under the constraint that $\text{tr}(R_1^\dagger R_1) \leq \epsilon_1^2$. Now the worst-case SINR can be expressed as:

$$\min_{R_1 \in \mathbb{C}^{M-r_1 \times r_1} : \|R_1\|_F^2 \leq \epsilon_1^2} \frac{\|u_1^\dagger \hat{G}_1 \hat{D}_1^{1/2}\|^4}{\|u_1^\dagger \hat{G}_1 \hat{D}_1^{1/2}\|^2 + |u_1^\dagger \hat{G}_1 \hat{D}_1 (\hat{G}_1^\dagger + R_1^\dagger Q_1^\dagger) u_T|^2} \quad (A4)$$

which can be simplified as $$\frac{\|u_1^\dagger \hat{G}_1 \hat{D}_1^{1/2}\|^4}{\|u_1^\dagger \hat{G}_1 \hat{D}_1^{1/2}\|^2 + \left( |u_1^\dagger \hat{G}_1 \hat{D}_1 \hat{G}_1^\dagger u_T| + \epsilon_1 \|u_1^\dagger \hat{G}_1 \hat{D}_1\| \|Q_1^\dagger u_T\| \right)^2} \quad (A5)$$

Note that in case zero-forcing (ZF) transmit precoding is used (5) further simplifies to $$\frac{\|u_1^\dagger \hat{G}_1 \hat{D}_1^{1/2}\|^4}{\|u_1^\dagger \hat{G}_1 \hat{D}_1^{1/2}\|^2 + (\epsilon_1 \|u_1^\dagger \hat{G}_1 \hat{D}_1\| \|Q_1^\dagger u_T\|)^2} \quad (A6)$$

Several other combinations are possible, some of which are highlighted below:

The UE feedsback SU CSI (comprising of a PMI $\hat{G}_1$ of rank $r_1$ and CQI(s) (which are mapped to the SINRs $\{\text{SI}\hat{N}R_1^1, \ldots, \text{SI}\hat{N}R_1^{r_1}\}$) assuming a post-scheduling model as in (A1). The eNB however assumes a post-scheduling model as in (A3) in which it fixes $$\hat{D}_1 = \frac{r_1}{\rho_1} \text{diag}\{SI\hat{N}R_1^1, \ldots, SI\hat{N}R_1^{r_1}\}$$

and $\hat{V}_1 = \hat{G}_1$. Note that now $R_1$ is not known and $Q_1$ is only known to lie in the subspace determined by $I - \hat{G}_1 \hat{G}_1^\dagger$. The eNB can assume a certain receiver structure at the UE (typically either a linear MMSE or a MRC receiver). Note that in either case the covariance matrix of the (intra-cell) interfere is given by $S_1 = \hat{D}_1^{1/2} (\hat{V}_1^\dagger + E_1^\dagger) U_T U_1^\dagger (E_1 + \hat{V}_1) \hat{D}_1^{1/2}$ in which $E_1$ in particular is not known. The eNB can adopt one of two approaches. In the first one, it can impose a suitable distribution on $E_1$ (based possibly on past CSI and ACK/NACKs received from that user) and then compute an expected covariance matrix $E[S_1]$. One example (supposing $M - r_1 \leq r_1$) is one where $Q_1$ is a random $M \times r_1$ matrix whose columns are the isotropically distributed in the orthogonal complement of $G_1$ and $R_1 = \epsilon'_1 I$ where $\epsilon'_1$ is a constant selected based on past CSI and ACK/NACKs received from user 1. Then it can determine SINRs using the known formulas for the MRC and MMSE receivers over a linear model $$y_1 = \hat{D}_1^{1/2} \hat{V}_1^\dagger U_1 s_1 + \tilde{\eta}_1, \quad (A7)$$

but where $\tilde{\eta}_1 \sim CN(0, I + E[S_1])$ is the independent additive noise vector. In the second approach the eNB can assume $S_1$ to be an unknown but deterministic matrix which lies in a bounded region. The bounded region can itself be defined based possibly on past CSI and ACK/NACKs received from that user. An example of such a region would be one comprising of all $S_i$ matrices such that $S_1 = \hat{D}_1^{1/2} (\hat{V}_1^\dagger + R_1^\dagger Q_1^\dagger) U_T U_T^\dagger (Q_1 R_1 + \hat{V}_1) \hat{D}_1^{1/2}$ where $Q_1$ is a deterministic $M \times (M - r_1)$ matrix whose columns are the basis of the orthogonal complement of $G_1$. $R_1$ is any $(M - r_1) \times r_1$ matrix satisfying $tr(R_1^\dagger R_1) \leq \epsilon_1^2$ and where $\epsilon_1^2$ is a constant selected based on past CSI and ACK/NACKs received from user 1. Then it can determine worst case SINRs for either MMSE or MRC receivers by minimizing the respective SINRs over all matrices in the defined bounded region.

The UE feedsback SU CSI along with additional MU-CQI(s) and possibly an MU-PMI. Suppose that based on the received feedback the eNB can determine a PMI $\hat{G}_1$ of rank $r_1$ and corresponding MU-SINRs $\{\text{SI}\hat{N}R_1^1, \ldots, \text{SI}\hat{N}R_1^{r_1}\}$). It can then assume a post-scheduling model as in (A1) in which it fixes $\hat{V}_1 = \hat{G}_1$ and either sets $$\hat{D}_1 = \frac{r_1}{\alpha \rho_1} \text{diag}\{SI\hat{N}R_1^1, \ldots, SI\hat{N}R_1^{r_1}\}$$

(in the case UE-1 is configured to assume that a fraction $\alpha$ of the EPRE is shared equally among desired $r_1$ streams) or $$\hat{D}_1 = \frac{S}{\rho_1} \text{diag}\{SI\hat{N}R_1^1, \ldots, SI\hat{N}R_1^{r_1}\}$$

(in the case UE-1 is configured to assume that the EPRE is shared equally among S co-scheduled streams). Note that since all variables in this model (apart from the additive noise) are known, the eNB can compute SINRs using known formulas for the MRC and MMSE receivers.

The UE feedsback SU CSI (comprising of a PMI $\hat{G}_1$ of rank $r_1$ and CQI(s) (which are mapped to the SINRs $\{\text{SI}\hat{N}R_1^1, \ldots, \text{SI}\hat{N}R_1^{r_1}\}$) along with additional residual error information assuming a post-scheduling model as in (A3). The eNB also assumes a post-scheduling model as in (A3) in which in which it fixes $$\hat{D}_1 = \frac{r}{\rho_1} \text{diag}\{SI\hat{N}R_1^1, \ldots, SI\hat{N}R_1^{r_1}\}$$

and $\hat{V}_1 = \hat{G}_1$. Depending on the type of residual error feedback, the information that the eNB may deduce about $E_1$ can range from a full approximation in which case the eNB may regard $E_1$ to be equal to a deterministic known matrix $\hat{E}_1$ to the case where only diag$\{C_1\}$ or tr$(C_1)$ is known. The eNB can use the two aforementioned approaches assuming either MMSE or MRC receiver at the UE. In particular, the eNB can regard $S_1 = \hat{D}_1^{1/2} (\hat{V}_1^\dagger + E_1^\dagger) U_T U_T^\dagger (E_1 + \hat{V}_1) \hat{D}_1^{1/2}$ as a random matrix drawn using a suitable distribution on $E_1$ or the eNB can regard $S_1$ to be an unknown but deterministic matrix which lies in a bounded region. The bounded region or the imposed distribution can be based on past CSI and ACK/NACKs received from that user and may comply with the information that the eNB can deduce about $E_1$ from the UE's current feedback.

2 Simulation Results

We now evaluate the MU-MIMO performance with the different types of channel reports and the enhancement methods via system level simulations. The simulation parameters are summarized in Table A1.

2.1 Performance of MU-MIMO with SU CSI Report and Enhanced CSI Report

The cell average and the 5% cell edge spectral efficiencies of MU-MIMO with SU reports for various settings are provided in Table A2. The SU-MIMO performance is also included for comparisons. The ZF transmit precoding is employed for all MU-MIMO transmissions. We can see that without applying any scheduler optimization techniques, the MU-MIMO with SU reports performs even worse than the SU-MIMO. With simple −4 dB SINR offset to compensate for the over optimistic SU-MIMO reports, the performance is improved significantly

TABLE A1

Simulation Parameters

| Parameter | Assumption |
|---|---|
| Deployment scenario | IMT Urban Micro (UMi) |
| Duplex method and bandwidth | FDD: 10 MHz for downlink |
| Cell layout | Hex grid 19 sites, 3 cells/site |
| Transmission power at BS | 46 dBm |
| Number of users per sector | 10 |
| Network synchronization | Synchronized |
| Antenna configuration (eNB) | 4 TX co-polarized ant., 0.5-λ spacing |
| Antenna configuration (user) | 2 RX co-polarized ant., 0.5-λ spacing |
| Downlink transmission scheme | MU-MIMO: Max 2 users/RB; Each user can have rank 1 or 2 |
| Codebook | Rel. 8 codebook |
| Downlink scheduler | PF in time and frequency |
| Scheduling granularity: | 5 RBs |
| Feedback assumptions | 5 ms periodicity and 4 ms delay; Sub-band CQI and PMI feedback without errors. |
| Sub-band granularity: | 5 RBs |
| Downlink HARQ scheme | Chase Combining |
| Downlink receiver type | LMMSE |
| Channel estimation error | NA |
| Feedback channel error | NA |
| Control channel and reference signal overhead | 3 OFDM symbols for control; Used TBS tables in TS 36.213 | but is still below the SU-MIMO mark. We then impose a rank restriction, i.e., $r_{max}=1$ on all active users via codebook subset restriction. Considering SU reporting from all users, we incorporate a user pooling in the scheduler in which only users with a good average SNR are eligible for pairing. This helps to realize the benefit of MU-MIMO with the average spectral efficiency gain being 11.5%. Then, to obtain an understanding of the gains that can be achieved via enhanced CSI reporting, we consider the case when each user reports a normalized total residual error in addition to the SU-MIMO CSI report. At the base station we modeled the post-scheduling user received output as (A3) and considered the MRC SINR approximation for rate matching (6). To obtain an initial result, a common value of $\epsilon$ was used to obtain SINR approximations for any choice of pairing. The resulting the

TABLE A2

Spectral e±ciency of MU-MIMO with near orthogonal transmit precoding with zero-forcing (ZF); SU feedback or enhanced CSI feedback by the users.

| MU-MIMO/SU-MIMO | cell average | 5% cell-edge |
|---|---|---|
| SU-MIMO $r_{max}=2$ | 2.1488 | 0.0679 |
| without SINR offset $r_{max}=2$ | 1.49 | 0.0681 |
| SINR offset $r_{max}=2$ | 1.922 | 0.0698 |
| SINR offset plus pooling $r_{max}=1$ | 2.3964 (11.5%) | 0.0687 (1.2%) |
| MRC SINR approx. $r_{max}=1$ | 2.5141 (17.0%) | 0.0828 (21.9%) |

Relative percentage gains are over SU-MIMO.

spectral efficiency of MU-MIMO is 17% better than that of SU-MIMO. This demonstrates that substantial gains can be possible via the enhanced CSI reporting and improved SINR approximation.

2.2 Performance of MU-MIMO with MU Report

Table A3 provides the cell average and 5% cell-edge spectral efficiencies of MU-MIMO with various CSI reporting configurations involving MU-CQI feedback. In particular, we consider the scenario when all users report PMI and CQI(s) determined using MU-MIMO rules. Also, considered is a scenario in which high geometry (HG) users (whose average SNR is above a threshold) report complete MU and SU CSI reports to the base station whereas the remaining users feedback only SU CSI reports. The resulting cell spectral efficiency becomes 2.694 bit with the cost of a significant increase in the feedback signaling overhead. A more reasonable alternative is one where the SU CSI and MU CQI is obtained from HG users and the resulting the spectral efficiency is 2.6814. Note that the performance degradation compared to the full reporting by HG users is less than 0.5% and the gain over SU-MIMO is an impressive 24.8%.

TABLE A3

Spectral e±ciency of MU-MIMO with near orthogonal transmit precoding with zero-forcing (ZF); Long-term SNR (Geometry) based user pooling with SU-report by low geometry users; Rank-1 codebook restriction imposed on all users.

| Type of reports and user pooling | Average Cell SE | 5% Cell-edge |
|---|---|---|
| MU report by all users | 2.3321 (8.5%) | 0.0734 |
| MU + SU Report by HG users | 2.694 (25.4%) | 0.0963 |
| SU report + MU-CQI by HG users | 2.6814 (24.8%) | 0.0951 |

Relative percentage gains are over SU-MIMO.

Further System Details B

1 Related MU-MIMO Operation

The key hurdle that needs to be overcome in order to realize optimal MU-MIMO gains is the difficulty in modeling the received channel output seen by a user post-scheduling. While computing its CSI report, the user has an un-quantized estimate of its downlink channel but does not know the transmit precoder that will be employed by the base-station. On the other hand, the base station is free to select any transmit precoder but has to rely on the quantized CSI reported by the active users. To illustrate this, we consider a user of interest, say user-1, and model its received observations as $$z_1 = H_1^\dagger x_1 + \mu_1, \quad (B1)$$

where $H_1^\dagger \in \mathbb{C}^{N \times M}$ denotes the channel matrix, with N, M being the number of receive antennas at the user and the number of transmit antennas at the eNB, respectively. $u_1$ is the additive noise which assumed to be spatially white and $x_i$ is the signal transmitted by the eNB. In the usual SU-MIMO CSI reporting the user estimates $\rho_1 H_1$, where $\rho_1$ is the EPRE configured for the UE-1 and determines a desired precoder matrix $\hat{V}_1$ of rank $r_1$ after assuming that no other user will be co-scheduled with it. As a byproduct, it also determines a linear filter $F_1$ and $r_1$ SINRs, $\{SINR_1^i\}_{i=1}^{r_1}$. The understanding is that if the base station transmits using a transmit precoder $$\sqrt{\frac{\rho_1}{r_1}} \hat{V}_1,$$

then the effective SINR seen by the UE (after filtering using the filter $F_1$ to remove interference among columns of $H_1^\dagger \hat{V}_1$) for the $i^{th}$ layer (sent along the $i^{th}$ column of $\hat{V}_1$) will be $SINR_1^i$. Mathematically, the filtered received observation vector, under SU-MIMO transmission, can be modeled as $$y_1 = F_1 z_1 = \sqrt{\frac{\rho_1}{r_1}} F_1 H_1^\dagger \hat{V}_1 s_1 + \eta_1, \quad (B2)$$

where $s_1$ is the symbol vector containing $r_1$ normalized QAM symbols and where $$\text{diag}\left(\sqrt{\frac{\rho_1}{r_1}} F_1 H_1^\dagger \hat{V}_1\right) = \text{diag}\left\{\sqrt{SINR_1^1}, \ldots, \sqrt{SINR_1^{r_1}}\right\}.$$

The user feedsback the PMI $\hat{V}_1$ and quantized SINRs $\{SI\hat{N}R_1^i\}_{i=1}^{r_1}$ to the eNB.

The eNB obtains $$\hat{V}_1 \text{ and } \hat{D}_1 = \frac{r_1}{\rho_1} \text{diag}\{SI\hat{N}R_1^1, \ldots, SI\hat{N}R_1^{r_1}\}$$

based on the user's SU-MIMO CSI report. For SU-MIMO transmission, the eNB assumes a post-scheduling model for user-1 by approximating (B1) as $$y_1 \approx \hat{D}_1^{1/2} \hat{V}_1^\dagger U_1 s_1 + \eta_1, \quad (B3)$$

where $\eta_1$ is assumed to a spatially white noise vector and $U_1$ denotes the transmit precoder along which symbols to user-1 are sent. Furthermore, an approach quite popular in MU-MIMO studies is to employ the following model for the received output seen by user-1, when it is co-scheduled with other users in an MU-MIMO transmission:

$$y_1 = \hat{D}_1^{1/2} \hat{V}_1^\dagger U_1 s_1 + \hat{D}_1^{1/2} \hat{V}_1^\dagger U_{\bar{1}} s_{\bar{1}} + \eta_1, \quad (B4)$$

where $hd \bar{1}$ contains all the remaining columns of the transmit precoder used for the co-scheduled streams. Letting $A = [U_1, U_{\bar{1}}]$ denote the MU-MIMO transmit precoding matrix, with rank $(U_1) = r'_1 \leq r_1$, the base-station can obtain the following approximation for the SINRs seen by user-1 post-scheduling.

$$si\hat{n}r_1^i = \frac{\hat{\alpha}_1^i}{1-\hat{\alpha}_1^i}, \quad (B5)$$

$$\hat{\alpha}_1^i = \left[(I + A^\dagger \hat{S}_1 A)^{-1} A^\dagger \hat{S}_1 A\right]_{i,i}, \quad 1 \leq i \leq r'_1,$$

where $\hat{S}_1 \triangleq \hat{V}_1 \hat{D}_1 \hat{V}_1^\dagger$. Since this SINR approximation is obtained by ignoring the component of the user channel that lies in the orthogonal complement of $\hat{V}_1$, it is an over-estimation and can in-fact degrade system performance without appropriate compensation.

2 Enhanced MU-MIMO Operation

The user, when configured by the eNB, reports SU-MIMO CSI plus a residual error term. The eNB can configure a user (to report the additional feedback) in a semi-static manner. We consider a simple form of residual error referred to as the residual error norm. Then, using SU-MIMO rules the user first determines a PMI $\hat{V}_1$ Of some rank $r_1$ along with $r_1$ quantized SINRs $\{SI\hat{N}R_1^i\}_{i=1}^{r_1}$. Note that $r_1$ can be determined by the user or it can be enforced by the eNB via codebook subset restriction. The residual error norm is determined by the user as $$\tilde{\epsilon}_1 = \sqrt{tr(F_1 H_1^\dagger P_1 H_1 F_1^\dagger)}, \quad (B5)$$

where tr(.) denotes the trace operation and $P_1 = (I - \hat{V}_1 \hat{V}_1^\dagger)$ is a projection matrix. Note that $\tilde{\epsilon}_1$ represents the residual total energy in the component of the filtered channel that lies in the orthogonal complement of the reported precoder $\hat{V}_1$. The user reports the usual SU-MIMO CSI along with the residual error norm $\tilde{\epsilon}_1$ or a normalized residual error norm $\epsilon_1$ computed using $$\epsilon_1 = \sqrt{tr(F_1 H_1^\dagger P_1 H_1 F_1^\dagger \tilde{D}_1^{-1})}, \quad (B7)$$

where $\tilde{D}_1 = \text{diag}\{SI\hat{N}R_1^1, \ldots, SI\hat{N}R_1^{r_1}\}$.

The eNB can use the residual error norms reported by the users to determine accurate SINRs for any choice of user pairing in MU-MIMO. To achieve this, it employs a finer approximation of the filtered channel matrix $(F_1 H_1^\dagger)$ of user-1 given by $$\hat{D}_1^{1/2}(\hat{V}_1^\dagger + R_1^\dagger Q_1^\dagger), \quad (B8)$$

where $Q_1 \in \mathbb{C}^{M \times M - r_1}$ is a semi-unitary matrix whose columns lie in the orthogonal complement of $\hat{V}_1$, i.e. $Q_1^\dagger \hat{V}_1 = 0$ and $R_1 \in \mathbb{C}^{M - r_1 \times r_1}$ is a matrix which satisfies the Frobenius-norm constraint $$\|R_1\|_F^2 \leq \frac{\rho_1}{r_1} \epsilon_1^2,$$

where $\epsilon_1 > 0$ is the normalized residual error norm reported by user-1. Suppose the transmit precoder U is parsed as $U = [U_1, U_{\bar{1}}]$. For a well designed transmit precoder, the eNB can make the reasonable assumption that $U_1$ (almost) lies in the span of $\hat{V}_1$ whose columns represent the preferred directions along which user-1 wishes to receive its intended signal (so that $Q_1^\dagger U_1 \approx 0$). Then, a model more tuned to MU-MIMO operation can be obtained in which the channel output seen by user-1 post MU-MIMO scheduling is modeled as $$y_1 = \hat{D}_1^{1/2} \hat{V}_1^\dagger U_1 s_1 + \hat{D}_1^{1/2}(\hat{V}_1^\dagger + R_1^\dagger Q_1^\dagger) U_{\bar{1}} s_{\bar{1}} + \eta_1, \quad (B9)$$

The model in (B9) accounts for the fact that the component of $U_{\bar{1}}$ in the orthogonal complement of $\hat{V}_1$ can also cause interference to the UE. Notice that when only SU-MIMO CSI along with the normalized residual error norm is reported by the users, in the model in (B9) the eNB can only infer that the semi-unitary matrix $Q_1$ lies in the subspace determined by $I - \hat{V}_1 \hat{V}_1^\dagger$ and $R_1$ is also not known except for the fact that $$tr(R_1^\dagger R_1) = \frac{\rho_1}{r_1} \epsilon_1^2.$$

For brevity, we illustrate one instance of how the eNB can utilize the model in (B9) for MU-MIMO SINR computation by considering a practically important MU-MIMO configuration, which is co-scheduling a user-pair with one stream per-user so that both $U_1 = u_1$ and $U_{\bar{1}} = u_{\bar{1}}$ are rank-1 vectors. Using the model in (B9), we will compute the worst-case SINR obtained by minimizing the SINR, over all feasible choices of $R_1, Q_1$. Without loss of generality, we assume $Q_1$ to be a deterministic $M \times (M - r_1)$ semi-unitary matrix whose columns are the basis of the orthogonal complement of $V_1$ and consider all possible $(M - r_1) \times r_1$ matrices $R_1$ satisfying the constraint that $$tr(R_1^\dagger R_1) \leq \frac{\rho_1}{r_1} \epsilon_1^2.$$

Further, to obtain a conservative SINR estimate, the eNB can assume that the UE employs a simple MRC receiver, i.e., user-1 is assumed to use the linear combiner $u_1^\dagger \hat{V}_1 \hat{D}_1^{1/2}$ on the model in (B9). Then, the worst-case SINR can be expressed as:

$$\min_{R_1 \in \mathbb{C}^{M-r_1 \times r_1}: \|R_1\|_F^2 \leq \frac{\rho_1}{r_1}\epsilon_1^2} \frac{\|u_1^\dagger \hat{V}_1 \hat{D}_1^{1/2}\|^4}{\|u_1^\dagger \hat{V}_1 \hat{D}_1^{1/2}\|^2 + |u_1^\dagger \hat{V}_1 \hat{D}_1(\hat{V}_1^\dagger + R_1^\dagger Q_1^\dagger)u_T|^2} \quad (B10)$$

which can be simplified as $$\frac{\|u_1^\dagger \hat{V}_1 \hat{D}_1^{1/2}\|^4}{\|u_1^\dagger \hat{V}_1 \hat{D}_1^{1/2}\|^2 + \left(|u_1^\dagger \hat{V}_1 \hat{D}_1 \hat{V}_1^\dagger u_T| + \sqrt{\frac{\rho_1}{r_1}}\epsilon_1 \|u_1^\dagger \hat{V}_1 \hat{D}_1\| \|Q_1^\dagger u_T\|\right)^2} \quad (B11)$$

Note that in case zero-forcing (ZF) transmit precoding is used (11) further simplifies to $$\frac{\|u_1^\dagger \hat{V}_1 \hat{D}_1^{1/2}\|^4}{\|u_1^\dagger \hat{V}_1 \hat{D}_1^{1/2}\|^2 + \left(\sqrt{\frac{\rho_1}{r_1}}\epsilon_1 \|u_1^\dagger \hat{V}_1 \hat{D}_1\| \|u_T\|\right)^2}. \quad (B12)$$

TABLE B1

Simulation Parameters

| Parameter | Assumption |
|---|---|
| Deployment scenario | IMT Urban Micro (UMi) and Urban Macro (UMa) |
| Duplex method and bandwidth | FDD: 10 MHz for downlink |
| Cell layout | Hex grid 19 sites, 3 cells/site |
| Transmission power at BS | 46 dBm |
| Number of users per sector | 10 |
| Network synchronization | Synchronized |
| Antenna configuration (eNB) | 4 TX cross-polarized ant., 0.5-λ spacing |
| Antenna configuration (user) | 2 RX cross-polarized ant. |
| Downlink transmission scheme | Dynamic SU/MU-MIMO scheduling: MU-MIMO pairing: Max 2 users/RB; |
| Codebook | Rel. 8 codebook |
| Downlink scheduler | PF in time and frequency |
| Scheduling granularity: | 5 RBs |
| Feedback assumptions | 5 ms periodicity and 4 ms delay; Sub-band CQI and PMI feedback without errors. |
| Sub-band granularity: | 5 RBs |
| Downlink HARQ scheme | Chase Combining |
| Downlink receiver type | LMMSE |
| Channel estimation error | NA |
| Feedback channel error | NA |
| Control channel and reference signal overhead | 3 OFDM symbols for control; Used TBS tables in TS 36.213 |

3 Simulation Results

We now evaluate the MU-MIMO performance with the different types of channel reports and enhancement methods via system level simulations.

3.1 Performance of MU-MIMO in Homogenous Networks

We first consider a homogenous network for which the simulation parameters are summarized in Table B1. The cell average and the 5% cell edge spectral efficiencies of baseline scheme with SU-MIMO CSI user reports are provided in Table B2. The ZF transmit precoding is employed for all MU-MIMO transmissions. Also included are the spectral efficiencies for the

TABLE B2

Spectral efficiency of MU-MIMO with near orthogonal transmit precoding with zero-forcing (ZF); Baseline SU-MIMO feedback or enhanced CSI feedback by the users.

| MU-MIMO/SU-MIMO | cell average | 5% cell-edge |
|---|---|---|
| Baseline $r_{max} = 2$ | 2.3403 | 0.0621 |
| Enhanced feedback $r_{max} = 1$ | 2.478 (5.88%) | 0.0743 |
| Enhanced feedback | 2.409 (2.94%) | 0.0705 (%) |
| SU-MIMO plus rank-1 enhanced feedback | 2.5352 (8.33%) | — |

Relative percentage gains are over the baseline scheme. The channel model is ITU Urban Micro (UMi).

case when a rank restriction, i.e., $r_{max}=1$ is imposed on all active users via codebook subset restriction. Each user then reports its enhanced feedback including SU-MIMO CSI and the corresponding normalized residual error norm. Next, we consider the case when the rank one restriction is removed and each user first determines and reports its SU-MIMO CSI (for the rank it considers best) followed by the normalized residual error norm. Note that in this case at the eNB scheduler we fix each user's transmission rank to be equal to its reported rank, i.e., if a user has reported rank-2 (rank-1), it will be served using rank-2 (rank-1) if scheduled. This restriction on scheduling flexibility limits the gains. Finally, we consider the case when each user determines and reports its SU-MIMO CSI (for the rank it considers best). Then, if the determined rank is one, it reports the normalized residual error norm. However, if the determined rank is two, it determines and reports a rank-1 precoder along with the corresponding normalized residual error norm. Notice that this form of enhanced feedback (referred to in Table B2 as SU-MIMO-plus-rank-1 enhanced feedback) allows for a more substantial system throughput gain.

3.2 Performance of MU-MIMO in Heterogenous Networks

We now consider a heterogenous network for which the simulation parameters are summarized in Table B3. Table B4 provides the cell average and 5% cell edge spectral efficiencies of both SU-MIMO and MU-MIMO. In order to obtain the MU-MIMO results we imposed a rank-1 codebook restriction on all users. Further, each user was configured to report a normalized residual error norm in addition to its SU-MIMO CSI report. We modeled the post-scheduling user received output as (B9) and considered the MRC SINR approximation (B12). No additional user pooling or SINR offset or OLLA was applied. We note that while more modest gains are obtained using residual error feedback, these gains are robust and can improve with other forms for enhanced feedback.

4 Appendix: More Enhanced User Feedback

We first note that the residual error, i.e., the component of the filtered user channel $F_1 H_1^\dagger$ in the orthogonal complement of $\hat{V}_1$ is given by $(I - \hat{V}_1 \hat{V}_1^\dagger) H_1 F_1^\dagger$. After normalization using $\tilde{D}$, this component becomes $(I - \hat{V}_1 \hat{V}_1^\dagger) H_1 F_1^\dagger \tilde{D}^{-1/2}$. The user reports $\hat{V}_1$ as well as $\tilde{D}$. In addition, the user can report some information about the normalized component in the orthogonal complement (normalized residual error). As aforementioned, a simple option is to report the normalized residual error norm $$\epsilon_1 = \sqrt{tr(F_1 H_1^\dagger P_1 F_1^\dagger \tilde{D}_1^{-1})}. \quad (B13)$$

More involved options can enable even more accurate SINR computation at the eNB for any choice of user pairing in MU-MIMO. These include the following:

User-1 obtains the QR decomposition of $(I-\hat{V}_1\hat{V}_1^\dagger)H_1F_1^\dagger\tilde{D}^{-1/2}$ given by $$(I-\hat{V}_1\hat{V}_1^\dagger)H_1F_1^\dagger\tilde{D}^{-1/2}=Q'_1R'_1, \quad (B14)$$

where $Q'_1 \in \mathbb{C}^{M \times M-r_1}$ is a semi-unitary matrix whose columns lie in the orthogonal complement of $\hat{V}_1$, i.e. $Q'_1{}^\dagger \hat{V}_1 = 0$ and $R'_1 \in \mathbb{C}^{M-r_1 \times r_1}$ is a matrix which satisfies the Frobenius-norm constraint $\|R'_1\|_F^2 = \epsilon_1^2$, where $\epsilon_1$ is the normalized residual error norm. Notice that the matrix $Q'_1$ in (14) is the same as $Q_1$ in (B9), whereas $$R_1 = \sqrt{\frac{\rho_1}{r_1}} R'_1.$$

Then, the user-1 can report the first few largest diagonal values of $R'_1$ along with the corresponding columns of $Q_1$ after quantizing them. In addition, it can also report the normalized residual error norm $\epsilon_1$. The number of diagonal values of $R'_1$ to be reported can be configured by the eNB or the user can report all diagonal values greater than a threshold specified by the eNB. The eNB receives this report and employs it for SINR computation.

In another form of residual error feedback the user can obtain the singular value decomposition of $(I-\hat{V}_1\hat{V}_1^\dagger)H_1F_1^\dagger\tilde{D}^{-1/2}$ given by $$(I-\hat{V}_1\hat{V}_1^\dagger)H_1F_1^\dagger\tilde{D}^{-1/2}=\tilde{U}_1\tilde{S}_1\tilde{W}_1^\dagger, \quad (B15)$$

where $\tilde{U}_1 \in \mathbb{C}^{M \times M-r_1}$ and $\tilde{W}_1 \in \mathbb{C}^{r_1 \times r_1}$ are semi-unitary and unitary matrices, respectively, and the diagonal values of $\tilde{S}_1$ are the singular values. Then, the user-1 can report the first few largest singular values in $\tilde{S}_1$ along with the corresponding columns of $\tilde{U}_1$ quantizing them. In addition, it can also report the normalized residual error norm $\epsilon_1$. The number of singular values to be reported can be configured by the eNB or the user can report all singular values greater than a threshold specified by the eNB. The eNB receives this report and employs it for SINR computation.

5 Appendix: Signaling Enhanced User Feedback

In each channel state information (CSI) reporting interval the user reports its CSI. The eNB can configure a user for periodic CSI reporting and fix the periodicity and offset which together determine the exact sequence of intervals for which the user may report its CSI. This sequence will be henceforth referred to as the sequence for CSI reporting.

In order to obtain the benefits of accurate MU-MIMO SINR computation without excessive feedback overhead, the eNB can multiplex intervals in which the user reports enhanced feedback with the ones in which it reports only its SU-MIMO CSI feedback. The periodicity and offset of the sub-sequence formed by intervals designated for enhanced feedback within the sequence for CSI reporting can be configured by the eNB, based on factors such as user mobility. Then, we have the following points that are of particular interest:

In the sequence for CSI reporting, in the intervals designated for only SU-MIMO CSI feedback, the user reports its preferred precoder matrix $\hat{V}_1$ and the corresponding quantized SINRs (determined using SU-MIMO rules). The user can select its preferred precoder matrix from a codebook of matrices under the constraint that it may be of a particular rank specified by the eNB or belong to a codebook subset specified by the eNB, or it can freely choose its preferred precoder matrix if no restrictions have been imposed by the eNB.

In each interval designated for enhanced feedback, the user can first determine its SU-MIMO CSI comprising of a precoder $\hat{V}_1$ and corresponding SINRs using SU-MIMO rules. As aforementioned, the user follows the restriction (if any) on rank or codebook subset that has been imposed by the eNB. The user uses $\hat{V}_1$ and $\tilde{D}_1$ (formed by the corresponding quantized SINRs) to determine any one of the forms of the residual error feedback described above. The particular feedback form will be configured by the eNB. The user then reports its SU-MIMO CSI along with the particular residual error feedback form. Differential feedback can be exploited in reporting the SU-MIMO CSI and the residual error feedback form. For instance, if the residual error feedback form consists of only the quantized residual error norm, then the user can report the SU-MIMO CSI and the difference of the largest (or smallest) reported SU-MIMO SINR, and the residual error norm. The user adopted convention for differential feedback is also configured by the eNB allowing it to reconstruct the residual error feedback form.

Alternatively, in each interval designated for enhanced feedback, the user can first determine its SU-MIMO CSI under a restriction on rank or codebook subset that has been imposed by the eNB, where the said restriction applies only to intervals designated for enhanced feedback. The eNB can freely choose any restriction for the other intervals in the sequence for CSI reporting. The user then uses the determined precoder $\hat{V}_1$ and $\tilde{D}_1$ (formed by the corresponding quantized SINRs) to determine the eNB configured residual error feedback form and reports it along with its SU-MIMO CSI.

Another option for each interval designated for enhanced feedback is also possible. Here the rank of the precoder $\hat{V}_1$ to be determined via SU-MIMO rules, can itself be a function of the previous S ranks of the precoders selected by the user in the previous S intervals designated for only SU-MIMO CSI feedback. The function is pre-defined and known to both the user and the eNB. An example is where S=1 and the rule is that rank selected for the current interval designated for enhanced feedback is equal to one when the rank in the previous interval designated for only SU-MIMO CSI feedback is also equal to one; and the rank in the current interval is two otherwise. Alternatively, $\hat{V}_1$ itself can be a function of the previous S precoders (and their corresponding SINRs) selected by the user in the previous S intervals designated for only SU-MIMO CSI feedback. The function is pre-defined and known to both the user and the eNB. In this case $\hat{V}_1$ need not be reported by the user since it can be deduced by the eNB.

Note that special cases of the sequence for CSI reporting described above, are the baseline case where each interval in the sequence is designated for SU-MIMO CSI only feedback and the one where each interval in the sequence is designated for enhanced feedback.

In order to obtain full benefits of accurate MU-MIMO SINR computation and scheduling flexibility, we can combine SU-MIMO CSI reporting and enhanced CSI reporting. Then, we have the following points of particular interest:

In each interval, the user can first determine its preferred precoder matrix $\hat{G}_1$ and the corresponding quantized SINRs using SU-MIMO rules. The user can select its preferred precoder matrix under the constraint that it may be of a particular rank specified by the eNB or belong to a codebook subset specified by the eNB, or it can freely choose its preferred precoder matrix if no restrictions have been imposed by the eNB. Next, in the same interval the user can determine another precoder matrix $\hat{V}_1$ and corresponding SINRs using SU-MIMO rules. The eNB can set a separate restriction on rank or codebook subset which $\hat{V}_1$ may obey. Notice in this case that if the rank enforced on $\hat{V}_1$ happens to be equal to that of $\hat{G}_1$, then $\hat{V}_1$ and its corresponding quantized SINRs need not be reported since they are identical to $\hat{G}_1$ and its corresponding quantized SINRs, respectively, since both the pairs are determined using SU-MIMO rules. Alternatively, the rank of precoder $\hat{V}_1$ can itself be a function of the rank of $\hat{G}_1$. The function is pre-defined and known to both the user and the eNB. An example rule is where rank of $\hat{V}_1$ may be equal to one when the rank of $\hat{G}_1$ is one; and the rank of $\hat{V}_1$ is two otherwise. In either case, using $\hat{V}_1$ along with the corresponding SINRs, the user determines the eNB configured residual error feedback form. The user feedback report now includes $\hat{G}_1$ and corresponding quantized SINRs as well as $\hat{V}_1$, its corresponding quantized SINRs and the residual error feedback form. Again, differential feedback can be exploited in reporting this CSI.

Alternatively, $\hat{V}_1$ itself can be a function of $\hat{G}_1$ and the SINRs corresponding to $\hat{G}_1$ and thus need not be reported since the function is pre-defined and known to both the user and the eNB. For instance, $\hat{V}_1$ can be the column of $\hat{G}_1$ for which the corresponding SINR is the largest among all SINRs corresponding to $\hat{G}_1$. Note here that if $\hat{V}_1$ is identical to $\hat{G}_1$ then even the quantized SINRs corresponding to $\hat{V}_1$ need not be reported since they are identical, respectively, to the quantized SINRs corresponding to $\hat{G}_1$.

TABLE B3

Simulation Parameters: Heterogeneous network with low power RRHs within the macro-cell coverage

| Parameter | Assumption |
|---|---|
| Deployment scenario | Scenario 3: Heterogeneous network with low power RRHs within the macrocell coverage - 1 cell with 2 low-power nodes (LPNs) ITU UMa for Macro, UMi for low power node |
| Duplex method and bandwidth | FDD: 10 MHz for downlink |
| Cell layout | Hex grid 19 sites, 3 cells/site |
| Antenna Height | Macro: 25 m; LPN: 10 m |
| Number of users per sector | Config4b: 30 |
| Network synchronization | Synchronized |
| UE noise figure | 9 dB |
| Minimum Distance | Macro - RRH/Hotzone: >75 m<br>Macro - UE: >35 m<br>RRH/Hotzone - RRH/Hotzone: >40 m<br>RRH/Hotzone - UE: >10 m |
| Handover margin | 1 dB |
| Indoor-outdoor modeling | 100% of users are dropped outdoor |
| Antenna configuration (eNB) | 4 TX co-pol. ant., 0.5-λ spacing for both Macro Cell and LPN |
| Antenna configuration (user) | 2 RX co-pol. ant., 0.5-λ spacing |
| Antenna pattern | For macro eNB: 3D, tilt 12 degree.<br>For low-power node: 2D |
| Downlink transmission scheme | SU-MIMO: Each user can have rank 1 or 2<br>MU-MIMO: Max 2 users/RB; Each user can have rank 1 |
| Codebook | Rel. 8 codebook |
| Downlink scheduler | PF in time and frequency |
| Scheduling granularity: | 5 RBs |

TABLE B3-continued

Simulation Parameters: Heterogeneous network with low power RRHs within the macro-cell coverage

| Parameter | Assumption |
|---|---|
| Feedback assumptions | 5 ms periodicity and 4 ms delay; Sub-band CQI and PMI feedback without errors. |
| Sub-band granularity: | 5 RBs |
| Downlink HARQ scheme | Chase Combining |
| Downlink receiver type | LMMSE |
| Channel estimation error | NA |
| Feedback channel error | NA |
| Control channel and reference signal overhead | 3 OFDM symbols for control; Used TBS tables in TS 36.213 |

TABLE B4

Spectral efficiency of SU-MIMO/MU-MIMO in Heterogenous Networks; For MU-MIMO Rank-1 codebook restriction is imposed on all users and enhanced feedback is obtained from all users.

| MU-MIMO/SU-MIMO | Average Cell SE | 5% Cell-edge |
|---|---|---|
| SU-MIMO Overall | 2.8621 | 0.078 |
| SU-MIMO Macro-cell | 2.2025 | 0.0622 |
| SU-MIMO LPN-RRH | 3.1919 | 0.0904 |
| MU-MIMO Overall | 3.1526 (10.15%, 5.59%) | 0.0813 |
| MU-MIMO Macro-cell | 2.5322 (14.97%, 8.54%) | 0.0721 |
| MU-MIMO LPN-RRH | 3.4628 (8.49%, 4.91%) | 0.1036 |

Relative percentage gains are over SU-MIMO and MU-MIMO without enhanced feedback, respectively.

Further System Details C

1 Related MU-MIMO Operation

The key hurdle that needs to be overcome in order to realize optimal MU-MIMO gains is the difficulty in modeling the received channel output seen by a user post-scheduling. While computing its CSI report, the user has an un-quantized estimate of its downlink channel but does not know the transmit precoder that will be employed by the base-station. On the other hand, the base station is free to select any transmit precoder but has to rely on the quantized CSI reported by the active users. To illustrate this, we consider a user of interest, say user-1, and model its received observations as $$z_1 = H_1^\dagger x_1 + \mu_1, \quad (C1)$$

where $H_1^\dagger \in \mathbb{C}^{N \times M}$ denotes the channel matrix, with N, M being the number of receive antennas at the user and the number of transmit antennas at the eNB, respectively. $\mu_1$ is the additive noise which assumed to be spatially white and $x_1$ is the signal transmitted by the eNB. In the usual SU-MIMO CSI reporting the user estimates $\rho_1 H_1$ where $\rho_1$ is the EPRE configured for the UE-1 and determines a desired precoder matrix $\hat{V}_1$ of rank $r_1$ after assuming that no other user will be co-scheduled with it. As a byproduct, it also determines a linear filter $F_1$ and $r_1$ SINRs, $\{SINR_1^i\}_{i=1}^{r_1}$. The understanding is that if the base station transmits using a transmit precoder $$\sqrt{\frac{\rho_1}{r_1}} \hat{V}_1,$$

then late SINR seen by the UE (after filtering using the filter $F_1$ to remove interference among columns of $H_1^\dagger \hat{V}_1$) for the $i^{th}$ layer (sent along the $i^{th}$ column of $\hat{V}_1$) will be $SINR_1^i$.

Mathematically, the filtered received observation vector, under SU-MIMO transmission, can be modeled as $$y_1 = F_1 z_1 = \sqrt{\frac{\rho_1}{r_1}} F_1 H_1^\dagger \hat{V}_1 s_1 + \eta_1, \quad (C2)$$

where $s_1$ is the symbol vector containing $r_1$ normalized QAM symbols and where $$\text{diag}\left(\sqrt{\frac{\rho_1}{r_1}} F_1 H_1^\dagger \hat{V}_1\right) = \text{diag}\left\{\sqrt{SINR_1^1}, \ldots, \sqrt{SINR_1^{r_1}}\right\}.$$

The user feedsback the PMI $\hat{V}_1$ and quantized SINRs $\{S\hat{I}NR_1^i\}_{i=1}^{r_1}$ to the eNB.

The eNB obtains $$\hat{V}_1 \text{ and } \hat{D}_1 = \frac{r_1}{\rho_1} \text{diag}\{S\hat{I}NR_1^1, \ldots, S\hat{I}NR_1^{r_1}\}$$

based on the user's SU-MIMO CSI report. For SU-MIMO transmission, the eNB assumes a post-scheduling model for user-1 by approximating (C1) as $$y_1 \approx \hat{D}_1^{1/2} \hat{V}_1^\dagger U_1 s_1 + \eta_1, \quad (C3)$$

where $\eta_1$ is assumed to a spatially white noise vector and $U_1$ denotes the transmit precoder along which symbols to user-1 are sent. Furthermore, an approach quite popular in MU-MIMO studies is to employ the following model for the received output seen by user-1, when it is co-scheduled with other users in an MU-MIMO transmission:

$$y_1 = \tilde{D}_1^{1/2} \hat{V}_1^\dagger U_1 s_1 + \tilde{D}_1^{1/2} \hat{V}_1^\dagger U_{\bar{T}} s_{\bar{T}} + \eta_1, \quad (C4)$$

where $U_{\bar{T}}$ contains all the remaining columns of the transmit precoder used for the co-scheduled streams. Letting $A = [U_1, U_{\bar{T}}]$ denote the MU-MIMO transmit precoding matrix, with rank $(U_1) = r'_1 \leq r_1$, the base-station can obtain the following approximation for the SINRs seen by user-1 post-scheduling.

$$s\hat{i}nr_1^i = \frac{\hat{\alpha}_1^i}{1 - \hat{\alpha}_1^i}, \quad (C5)$$

$$\hat{\alpha}_1^i = \left[(I + A^\dagger \hat{S}_1 A)^{-1} A^\dagger \hat{S}_1 A\right]_{i,i}, \quad 1 \leq i \leq r'_1,$$

where $\hat{S}_1 \triangleq \hat{V}_1 \hat{D}_1 \hat{V}_1^\dagger$. Since this SINR, approximation is obtained by ignoring the component of the user channel that lies in the orthogonal complement of $\hat{V}_1$, it is an over-estimation and can in-fact degrade system performance without appropriate compensation.

2 Enhanced MU-MIMO Operation

The user, when configured by the eNB, reports SU-MIMO CSI plus a residual error term. The eNB can configure a user (to report the additional feedback) in a semi-static manner. We consider a simple form of residual error referred to as the residual error norm. Then, using SU-MIMO rules the user first determines a PMI $\hat{V}_1$ of some rank $r_1$ along with $r_1$ quantized SINRs $\{S\hat{I}NR_1^i\}_{i=1}^{r_1}$. Note that $r_1$ can be determined by the user or it can be enforced by the eNB via codebook subset restriction. The residual error norm is determined by the user as $$\tilde{\epsilon}_1 = \sqrt{tr(F_1 H_1^\dagger P_1 H_1 F_1^\dagger)}, \quad (C6)$$

where $tr(.)$ denotes the trace operation and $P_1 = (I - \hat{V}_1 \hat{V}_1^\dagger)$ is a projection matrix. Note that $\tilde{\epsilon}_1$ represents the residual total energy in the component of the filtered channel that lies in the orthogonal complement of the reported precoder $\hat{V}_1$. The user reports the usual SU-MIMO CSI along with the residual error norm $\tilde{\epsilon}_1$ or a normalized residual error norm $\epsilon_1$ computed using $$\epsilon_1 = \sqrt{tr(F_1 H_1^\dagger P_1 H_1 F_1^\dagger \tilde{D}_1^{-1})}, \quad (C7)$$

where $\tilde{D}_1 = \text{diag}\{S\hat{I}NR_1^1, \ldots, S\hat{I}NR_1^{r_1}\}$.

The eNB can use the residual error norms reported by the users to determine accurate SINRs for any choice of user pairing in MU-MIMO. To achieve this, it employs a finer approximation of the filtered channel matrix $(F_1 H_1^\dagger)$ of user-1 given by $$\hat{D}_1^{1/2}(\hat{V}_1^\dagger + R_1^\dagger Q_1^\dagger), \quad (C8)$$

where $Q_1 \in \mathbb{C}^{M \times M - r_1}$ is a semi-unitary matrix whose columns lie in the orthogonal complement of $\hat{V}_1$, i.e. $Q_1^\dagger \hat{V}_1 = 0$ and $R_1 \in \mathbb{C}^{M - r_1 \times r_1}$ is a matrix which satisfies the Frobenius-norm constraint $$\|R_1\|_F^2 \leq \frac{\rho_1}{r_1} \epsilon_1^2,$$

where $\epsilon_1 > 0$ is the normalized residual error norm reported by user-1. Suppose the transmit precoder U is parsed as $U = [U_1, U_{\bar{T}}]$. For a well designed transmit precoder, the eNB can make the reasonable assumption that $U_1$ (almost) lies in the span of $\hat{V}_1$ whose columns represent the preferred directions along which user-1 wishes to receive its intended signal (so that $Q_1^\dagger U_1 \approx 0$). Then, a model more tuned to MU-MIMO operation can be obtained in which the channel output seen by user-1 post MU-MIMO scheduling is modeled as $$y_1 = \hat{D}_1^{1/2} \hat{V}_1^\dagger U_1 s_1 + \hat{D}_1^{1/2}(\hat{V}_1^\dagger + R_1^\dagger Q_1^\dagger) U_{\bar{T}} s_{\bar{T}} + \eta_1, \quad (C9)$$

The model in (C9) accounts for the fact that the component of $U_{\bar{T}}$ the orthogonal complement of $\hat{V}_1$ can also cause interference to the UE. Notice that when only SU-MIMO CSI along with the normalized residual error norm is reported by the users, in the model in (C9) the eNB can only infer that the semi-unitary matrix $Q_1$ lies in the subspace determined by $I - \hat{V}_1 \hat{V}_1^\dagger$ and $R_1$ is also not known except for the fact that $$tr(R_1^\dagger R_1) = \frac{\rho_1}{r_1} \epsilon_1^2.$$

We illustrate an important instance of how the eNB can utilize the model in (C9) for MU-MIMO SINR, computation by considering the practically important MU-MIMO configuration, which is co-scheduling a user-pair. We first consider co-scheduling two users with one stream per-user so that both $U_1 = u_1$ and $U_{\bar{T}} = u_{\bar{T}}$ are rank-1 vectors. Using the model in (C9), we will compute the worst-case SINR obtained by minimizing the SINR over all feasible choices of $R_1, Q_1$. Without loss of generality, we assume $Q_1$ to be a deterministic $M \times (M - r_1)$ semi-unitary matrix whose columns are the basis of the orthogonal complement of $\hat{V}_1$ and consider all possible $(M - r_1) \times r_1$ matrices $R_1$ satisfying the constraint that $$tr(R_1^\dagger R_1) \le \frac{\rho_1}{r_1}\epsilon_1^2.$$

Further, to obtain a conservative SINR estimate, the eNB can assume that the UE employs a simple MRC receiver, i.e., user-1 is assumed to use the linear combiner $u_1^\dagger \hat{V}_1 \hat{D}_1^{1/2}$ on the model in (C9). Then, the worst-case SINR can be expressed as:

$$\min_{R_1 \in \mathbb{C}^{M-r_1 \times r_1}: \|R_1\|_F^2 \le \frac{\rho_1}{r_1}\epsilon_1^2} \frac{\|u_1^\dagger \hat{V}_1 \hat{D}_1^{1/2}\|^4}{\|u_1^\dagger \hat{V}_1 \hat{D}_1^{1/2}\|^2 + |u_1^\dagger \hat{V}_1 \hat{D}_1(\hat{V}_1^\dagger + R_1^\dagger Q_1^\dagger)u_T|^2}. \quad (C10)$$

Simple manipulations reveal that (C10) is equal to $$\frac{\|u_1^\dagger \hat{V}_1 \hat{D}_1^{1/2}\|^4}{\|u_1^\dagger \hat{V}_1 \hat{D}_1^{1/2}\|^2 + \left(|u_1^\dagger \hat{V}_1 \hat{D}_1 \hat{V}_1^\dagger u_T| + \sqrt{\frac{\rho_1}{r_1}}\epsilon_1 \|u_1^\dagger \hat{V}_1 \hat{D}_1\| \|Q_1^\dagger u_T\|\right)^2} \quad (C11)$$

which in turn can be simplified as $$\frac{\left(\|u_1^\dagger \hat{V}_1 \hat{D}_1^{1/2}\|^4\right)}{\|u_1^\dagger \hat{V}_1 \hat{D}_1^{1/2}\|^2 + \left(|u_1^\dagger \hat{V}_1 \hat{D}_1 \hat{V}_1^\dagger u_T| + \sqrt{\frac{\rho_1}{r_1}}\epsilon_1 \|u_1^\dagger \hat{V}_1 \hat{D}_1\| \sqrt{u_T^\dagger (I - \hat{V}_1 \hat{V}_1^\dagger) u_T}\right)^2} \quad (C12)$$

We next consider co-scheduling two users with one stream for user-1 so that $U_1 = u_1$ is a rank-1 vector and two streams for the other user so that $U_T$ is a rank-2 matrix. As before, to obtain a conservative SINR estimate, the eNB can assume that the UE employs a simple MRC receiver, and the worst-case SINR can be expressed as:

$$\min_{R_1 \in \mathbb{C}^{M-r_1 \times r_1}: \|R_1\|_F^2 \le \frac{\rho_1}{r_1}\epsilon_1^2} \frac{\|u_1^\dagger \hat{V}_1 \hat{D}_1^{1/2}\|^4}{\|u_1^\dagger \hat{V}_1 \hat{D}_1^{1/2}\|^2 + \|u_1^\dagger \hat{V}_1 \hat{D}_1(\hat{V}_1^\dagger + R_1^\dagger Q_1^\dagger)U_T\|^2}. \quad (C13)$$

Next let $a = u_1^\dagger \hat{V}_1 \hat{D}_1 \hat{V}_1^\dagger U_T$ and $b = u_1^\dagger \hat{V}_1 \hat{D}_1$ and $U_T^\dagger Q_1 Q_1^\dagger U_T = U_T^\dagger (I - \hat{V}_1 \hat{V}_1^\dagger) U_T$. Let the eigen value decomposition of S be $S = E \Lambda E^\dagger$, where $\Lambda = \text{diag}\{\lambda_1^2, \lambda_2^2\}$ and expand the 1×2 vector b as $b = \|b\|[1, 0]A^\dagger$, where A is a 2×2 unitary matrix. Then, letting $\tilde{a} = [\tilde{\alpha}_1, \tilde{\alpha}_2] = aE$, we can show that $$\max_{R_1 \in \mathbb{C}^{M-r_1 \times r_1}: \|R_1\|_F^2 \le \frac{\rho_1}{r_1}\epsilon_1^2} \left\{\|u_1^\dagger \hat{V}_1 \hat{D}_1(\hat{V}_1^\dagger + R_1^\dagger Q_1^\dagger)U_T\|^2\right\} = \quad (C14)$$

$$\max_{x,y \in \mathbb{R}^+: x^2 + y^2 \le \frac{\rho_1}{r_1}\epsilon_1^2} \{(|\tilde{a}_1| + \|b\|\lambda_1 x)^2 + (|\tilde{a}_2| + \|b\|\lambda_2 y)^2\}$$

(C14) is a non-convex optimization problem and letting $c_1 = \lambda_1 \|b\|$, $c_2 = \lambda_2 \|b\|$ and $$\check{\epsilon} = \sqrt{\frac{\rho_1}{r_1}}\epsilon_1$$

we approximate (C 14) by $$\max\{(|\tilde{\alpha}_1| + c_1\check{\epsilon})^2 + |\tilde{\alpha}_2|^2, (|\tilde{\alpha}_2| + c_2\check{\epsilon})^2 + |\tilde{\alpha}_1|^2\}. \quad (C15)$$

Using (C15) in (C13) we can obtain an approximate SINR given by $$\frac{\|u_1^\dagger \hat{V}_1 \hat{D}_1^{1/2}\|^4}{\|u_1^\dagger \hat{V}_1 \hat{D}_1^{1/2}\|^2 + \max\left\{(|\tilde{a}_1| + c_1\check{\epsilon})^2 + |\tilde{a}_2|^2, (|\tilde{a}_2| + c_2\check{\epsilon})^2 + |\tilde{a}_1|^2\right\}}. \quad (C16)$$

Indeed the steps used to obtain the approximate SINRs in (C12) and (C 16) can be readily extended to obtain the approximate SINRs for all permissible user co-scheduling configurations, all of which may satisfy co-scheduling no more than four streams in total with no more than two streams per-user.

TABLE C1

Simulation Parameters for Homogenous Networks

| Parameter | Assumption |
|---|---|
| Deployment scenario | IMT Urban Micro (UMi) and Urban Macro (UMa) |
| Duplex method and bandwidth | FDD: 10 MHz for downlink |
| Cell layout | Hex grid 19 sites, 3 cells/site |
| Transmission power at BS | 46 dBm |
| Number of users per sector | 10 |
| Network synchronization | Synchronized |
| Antenna configuration (eNB) | 4 TX cross-polarized ant., 0.5-λ spacing |
| Antenna configuration (user) | 2 RX cross-polarized ant. |
| Downlink transmission scheme | Dynamic SU/MU-MIMO scheduling: MU-MIMO pairing: Max 2 users/RB; |
| Codebook | Rel. 8 codebook |
| Downlink scheduler | PF in time and frequency |
| Scheduling granularity: | 5 RBs |
| Feedback assumptions | 5 ms periodicity and 4 ms delay; Sub-band CQI and PMI feedback without errors. |
| Sub-band granularity: | 5 RBs |
| Downlink HARQ scheme | Chase Combining |
| Downlink receiver type | LMMSE |
| Channel estimation error | NA |
| Feedback channel error | NA |
| Control channel and reference signal overhead | 3 OFDM symbols for control; Used TBS tables in TS 36.213 |

3 Simulation Results

We now evaluate the MU-MIMO performance with the different types of channel reports and enhancement methods via system level simulations.

3.1 Performance of MU-MIMO in Homogenous Networks: Sub-Band CSI feedback

We first consider a homogenous network for which the simulation parameters are summarized in Table C1. We emphasize that each user computes and reports one precoding matrix index (PMI) and up-to two CQI(s) for each subband, along with one wideband rank indicator (RI) that is common for all subbands.[C1] The cell average and the 5% cell edge spectral efficiencies of baseline scheme with SU-MIMO CSI user reports are provided in Table C2. IMT Urban Micro (UMi) channel model is considered here. The ZF transmit precoding is employed for all MU-MIMO transmissions. Also included are the spectral efficiencies for the case when a rank restriction, i.e., $r_{max} = 1$ is imposed on all active users via codebook subset restriction. Each user then reports its enhanced feedback including SU-MIMO CSI and the corresponding per-subband normalized residual error norm. Next, we consider the case when the rank one restriction is removed and each user first determines and reports its SU-MIMO CSI (for the rank it considers best) followed by the per-subband normalized residual error norm. Note that in this case at the eNB scheduler we fix each user's transmission rank to be equal to its reported rank, i.e., if a user has reported rank-2 (rank-1), it will be served using rank-2 (rank-1) if scheduled. This restriction on scheduling flexibility limits the gains. We then consider the case when each user determines and reports its SU-MIMO CSI (for the rank it considers best). Then, if the determined rank is one, it reports the per-subband normalized residual error norm. However, if the determined rank is two, for each subband it determines and reports a rank-1 precoder along with the corresponding normalized residual error norm. Notice that this form of enhanced feedback (referred to in Table C2 as SU-MIMO-plus-rank-1 enhanced feedback) allows for a more substantial system throughput gain. Finally, we consider the case that the user reports its SU-MIMO CSI (for the rank it considers best) followed by the per-subband normalized residual error norm computed for corresponding the reported PMI. At the base station, the scheduler determines the user's transmission rank which could be lower than its reported rank. We can see that with rank override but without the additional per-subband rank-1 PMI feedback, the proposed scheme can still achieve a large gain over the baseline scheme. Note that the cell average performance for this case is even slightly better than the case of SU-MIMO-plus-rank-1 enhanced feedback. Further, no OLLA was applied to any scheme involving enhanced CSI feedback so that the gains

TABLE C2

Spectral efficiency of MU-MIMO with near orthogonal transmit precoding with zero-forcing (ZF); Per-subband SU-MIMO feedback or enhanced CSI feedback by the users.

| MU-MIMO/SU-MIMO | cell average | 5% cell-edge |
|---|---|---|
| Baseline $r_{max} = 2$ | 2.3576 | 0.0647 |
| Enhanced feedback $r_{max} = 1$ | 2.4815 (5.26%) | 0.0766 (18.4%) |
| Enhanced feedback (fixed rank) | 2.4125 (2.33%) | 0.0686 (6.03%) |
| SU-MIMO plus rank-1 enhanced feedback | 2.5567 (8.45%) | 0.0736 (13.8%) |
| Enhanced feedback (dynamic rank selection) | 2.5943 (10.04%) | 0.0717 (10.8%) |

Relative percentage gains are over the baseline scheme. The channel model is ITU Urban Micro (UMi).

TABLE C3

Spectral efficiency of MU-MIMO with near orthogonal transmit precoding with zero-forcing (ZF); Per-subband SU-MIMO feedback or enhanced CSI feedback by the users.

| MU-MIMO/SU-MIMO | cell average | 5% cell-edge |
|---|---|---|
| Baseline $r_{max} = 2$ | 2.2645 | 0.0654 |
| Enhanced feedback $r_{max} = 1$ | 2.3689 (4.61%) | 0.0780 (19.3%) |
| Enhanced feedback (fixed rank) | 2.3376 (3.23%) | 0.0736 (12.5%) |
| SU-MIMO pins rank-1 enhanced feedback | 2.4552 (8.42%) | 0.0774 (18.4%) |
| Enhanced feedback (dynamic rank selection) | 2.4753 (9.31%) | 0.0756 (15.6%) |

Relative percentage gains are over the baseline scheme. The channel model is ITU Urban Macro (UMa).

obtained are quite robust.

[C1] Two CQIs per-subband are reported whenever the reported rank is greater than or equal to two and one CQI is reported otherwise.

Similar results are obtained for IMT Urban Macro (UMa) channel model which are provided in Table C3.

3.2 Performance of MU-MIMO in Homogenous Networks: Wide-Band CSI Feedback

We again consider a homogenous network for which the simulation parameters are summarized in Table C1 except that now each user computes and reports a wideband PMI, wideband RI along with per-subband CQI(s).[C2] For enhanced feedback each user reports one additional wideband normalized residual error norm which is computed using the reported wideband PMI. The cell average and the 5% cell edge spectral efficiencies of baseline scheme with SU-MIMO

TABLE C4

Spectral efficiency of MU-MIMO with near orthogonal transmit precoding with zero-forcing (ZF); Wideband SU-MIMO feedback or enhanced CSI feedback by the users.

| MU-MIMO/SU-MIMO | cell average | 5% cell-edge |
|---|---|---|
| Baseline $r_{max} = 2$ | 2.342 | 0.0617 |
| Enhanced feedback (subband NREN) $r_{max} = 2$ | 2.5639 (9.47%) | 0.0664 (7.62%) |
| Enhanced feedback (wideband Average NREN) | 2.5345 (8.22%) | 0.0648 (5%) |
| Enhanced feedback (wideband Best M = 3 Average NREN) | 2.5459 (8.71%) | 0.0657 (6.48%) |

Relative percentage gains are over the baseline scheme. The channel model is ITU Urban Micro (UMi).

CSI user reports are provided in Table C4 considering the IMT Urban Micro (UMi) channel model. The ZF transmit precoding is employed for all MU-MIMO transmissions. Also included are the spectral efficiencies for the case when a rank restriction, i.e., $r_{max}=1$ is imposed on all active users via codebook subset restriction. Next, we consider the case when the rank one restriction is removed and each user first determines and reports its SU-MIMO CSI (for the rank it considers best) followed by the wideband normalized residual error norm (NREN). The wideband NREN is computed as the average of the per sub-band NRENs. At the base station, the scheduler determines the user's transmission rank which could be lower than its reported rank. Finally, we exploit the observation that each user is likely to be scheduled on subbands that it deems to be good. In particular, each user upon computing its SU-MIMO CSI also sorts the subbands in the decreasing order of the per-subband rates (which are determined using the corresponding per subband CQIs) and selects the first M subbands which offer the M largest rates. It then computes a normalized residual error norm for each one of these M subbands and takes their average. This average NREN is then additionally reported to the eNB. In the simulation we have set M=3. We note that substantial gains are obtained even with a wideband normalized residual error norm feedback. Further, no OLLA was applied to any scheme involving enhanced CSI feedback so that the gains obtained are quite robust.

[C2] The RI as well as the PMI are invariant across all subbands. Two CQIs per-subband are reported whenever the reported rank is greater than or equal to two and one CQIs reported otherwise.

Similar results have been observed for the IMT Urban Macro (UMa) channel model which are provided in Table C5.

TABLE C5

Spectral efficiency of MU-MIMO with near orthogonal transmit precoding with zero-forcing (ZF); Wideband SU-MIMO feedback or enhanced CSI feedback by the users.

| MU-MIMO/SU-MIMO | cell average | 5% cell-edge |
|---|---|---|
| Baseline $r_{max}$ = 2 | 2.2461 | 0.0648 |
| Enhanced feedback (subband NREN) $r_{max}$ = 2 | 2.4494 (9%) | 0.0715 (10.34%) |
| Enhanced feedback (wideband Average NREN) | 2.4136 (7.46%) | 0.0696 (7.4%) |
| Enhanced feedback (wideband Best M = 3 Average NREN) | 2.4397 (8.62%) | 0.0726 (12%) |

Relative percentage gains are over the baseline scheme. The channel model is ITU Urban Macro (UMa).

3.3 Performance of MU-MIMO in Heterogenous Networks

We now consider a heterogenous network for which the simulation parameters are summarized in Table C6. Table C7 provides the cell average and 5% cell-edge spectral efficiencies of both SU-MIMO and MU-MIMO. In order to obtain the MU-MIMO results we imposed a rank-1 codebook restriction on all users. Further, each user was configured to report a normalized residual error norm in addition to its SU-MIMO CSI report. We modeled the post-scheduling user received output as (C9) and considered the MRC SINR approximation (C12). No additional user pooling or SINR offset or OLLA was applied. We note that while more modest gains are obtained using residual error feedback, these gains are robust and can improve with other forms for enhanced feedback.

4 Appendix: More Enhanced User Feedback

We first note that the residual error, i.e., the component of the filtered user channel $F_1 H_1^\dagger$ in the orthogonal complement of $\hat{V}_1$ is given by $(I - \hat{V}_1 \hat{V}_1^\dagger) H_1 F_1^\dagger$. After normalization using $\tilde{D}_1$ this component becomes $(I - \hat{V}_1 \hat{V}_1^\dagger) H_1 F_1^\dagger \tilde{D}^{-1/2}$. The user reports $\hat{V}_1$ as well as $\tilde{D}$. In addition, the user can report some information about the normalized component in the orthogonal complement (normalized residual error). As aforementioned, a simple option is to report the normalized residual error norm $$\epsilon_1 = \sqrt{tr(F_1 H_1^\dagger P_1 H_1 F_1^\dagger \tilde{D}_1^{-1})}. \tag{C17}$$

More involved options can enable even more accurate SINR computation at the eNB for any choice of user pairing in MU-MIMO. These include the following:

User-1 obtains the QR decomposition of $(I - \hat{V}_1 \hat{V}_1^\dagger) H_1 F_1^\dagger \tilde{D}^{-1/2}$ given by $$(I - \hat{V}_1 \hat{V}_1^\dagger) H_1 F_1^\dagger \tilde{D}^{-1/2} = Q_1' R_1', \tag{C18}$$

where $Q_1' \in \mathbb{C}^{M \times M - r_1}$ is a semi-unitary matrix whose columns lie in the orthogonal complement of $\hat{V}_1$, i.e. $Q_1'^\dagger \hat{V}_1 = 0$ and $R_1' \in \mathbb{C}^{M - r_1 \times r_1}$ is a matrix which satisfies the Frobenius-norm constraint $\|R_1'\|_F^2 = \epsilon_1^2$, where $\epsilon_1$ is the normalized residual error norm. Notice that the matrix $Q_1'$ in (C18) is the same as $Q_1$ in (C9), whereas $$R_1 = \sqrt{\frac{\rho_1}{r_1}} R_1'.$$

Then, the user-1 can report the first few largest diagonal values of $R_1'$ along with the corresponding columns of $Q_1$ after quantizing them. In addition, it can also report the normalized residual error norm $\epsilon_1$. The number of diagonal values of $R_1'$ to be reported can be configured by the eNB or the user can report all diagonal values greater than a threshold specified by the eNB. The eNB receives this report and employs it for SINR computation.

In another form of residual error feedback the user can obtain the singular value decompostion of $(I - \hat{V}_1 \hat{V}_1^\dagger) H_1 F_1^\dagger \tilde{D}^{-1/2}$ given by $$(I - \hat{V}_1 \hat{V}_1^\dagger) H_1 F_1^\dagger \tilde{D}^{-1/2} = \tilde{U}_1 \tilde{S}_1 \tilde{W}_1^\dagger, \tag{C19}$$

where $\tilde{U}_1 \in \mathbb{C}^{M \times M - r_1}$ and $\tilde{W}_1 \in \mathbb{C}^{r_1 \times r_1}$ are semi-unitary and unitary matrices, respectively, and the diagonal values of $\tilde{S}_1$ are the singular values. Then, the user-1 can report the first few largest singular values in $\tilde{S}_1$ along with the corresponding columns of $\tilde{U}_1$ after quantizing them. In addition, it can also report the normalized residual error norm $\epsilon_1$. The number of singular values to be reported can be configured by the eNB or the user can report all singular values greater than a threshold specified by the eNB. The eNB receives this report and employs it for SINR, computation.

5 Appendix: Signaling Enhanced User CSI Feedback

In each channel state information (CSI) reporting interval the user reports its CSI. The eNB can configure a user for periodic CSI reporting and fix the periodicity and offset which together determine the exact sequence of intervals for which the user may report its CSI. This sequence will be henceforth referred to as the sequence for CSI reporting.

In order to obtain the benefits of accurate MU-MIMO SINR computation without excessive feedback overhead, the eNB can multiplex intervals in which the user reports enhanced feedback with the ones in which it reports only its SU-MIMO CSI feedback. The periodicity and offset of the sub-sequence formed by intervals designated for enhanced feedback within the sequence for CSI reporting can be configured by the eNB, based on factors such as user mobility. Then, we have the following points that are of particular interest:

In the sequence for CSI reporting, in the intervals designated for only SU-MIMO CSI feedback, the user reports its preferred precoder matrix $\tilde{V}_1$ and the corresponding quantized SINRs (determined using SU-MIMO rules). The user can select its preferred precoder matrix from a codebook of matrices under the constraint that it may be of a particular rank specified by the eNB or belong to a codebook subset specified by the eNB, or it can freely choose its preferred precoder matrix if no restrictions have been imposed by the eNB.

In each interval designated for enhanced feedback, the user can first determine its SU-MIMO CSI comprising of a precoder $V_1$ and corresponding SINRs using SU-MIMO rules. As aforementioned, the user follows the restriction (if any) on rank or codebook subset that has been imposed by the eNB. The user uses $\hat{V}_1$ and $\tilde{D}_1$ (formed by the corresponding quantized SINRs) to determine any one of the forms of the residual error feedback described above. The particular feedback form will be configured by the eNB. The user then reports its SU-MIMO CSI along with the particular residual error feedback form. Differential feedback can be exploited in reporting the SU-MIMO CSI and the residual error feedback form. For instance, if the residual error feedback form consists of only the quantized normalized residual error norm, then the user can report the SU-MIMO CSI and the difference of the largest (or smallest) reported SU-MIMO SINR and the residual error norm. The user adopted convention for differential feedback is also configured by the eNB allowing it to reconstruct the residual error feedback form.

Alternatively, in each interval designated for enhanced feedback, the user can first determine its SU-MIMO CSI under a restriction on rank or codebook subset that has been imposed by the eNB, where the said restriction applies only to intervals designated for enhanced feedback. The eNB can freely choose any restriction for the other intervals in the sequence for CSI reporting. The user then uses the determined precoder $\hat{V}_1$ and $\tilde{D}_1$ (formed by the corresponding quantized SINRs) to determine the eNB configured residual error feedback form and reports it along with its SU-MIMO CSI.

Another option for each interval designated for enhanced feedback is also possible. Here the rank of the precoder $\hat{V}_1$ to be determined via SU-MIMO rules, can itself be a function of the previous S ranks of the precoders selected by the user in the previous S intervals designated for only SU-MIMO CSI feedback. The function is pre-defined and known to both the user and the eNB. An example is where S=1 and the rule is that rank selected for the current interval designated for enhanced feedback is equal to one when the rank in the previous interval designated for only SU-MIMO CSI feedback is also equal to one; and the rank in the current interval is two otherwise. Alternatively, $\hat{V}_1$ itself can be a function of the previous S precoders (and their corresponding SINRs) selected by the user in the previous S intervals designated for only SU-MIMO CSI feedback. The function is pre-defined and known to both the user and the eNB. In this case $\hat{V}_1$ need not be reported by the user since it can be deduced by the eNB.

Note that special cases of the sequence for CSI reporting described above, are the baseline case where each interval in the sequence is designated for SU-MIMO CSI only feedback and the one where each interval in the sequence is designated for enhanced feedback. Finally, as an option to reduce feedback overhead, in all the aforementioned alternatives the CSI reports can include a wideband precoder matrix (i.e., a precoder matrix common for all sub-bands) along with sub-band specific SINRs and sub-band specific residual error feedback forms.

In order to obtain full benefits of accurate MU-MIMO SINR computation and scheduling flexibility, we can combine SU-MIMO CSI reporting and enhanced CSI reporting. Then, we have the following points of particular interest:

In each interval, the user can first determine its preferred precoder matrix $\hat{G}_1$ and the corresponding quantized SINRs using SU-MIMO rules. The user can select its preferred precoder matrix under the constraint that it may be of a particular rank specified by the eNB or belong to a codebook subset specified by the eNB, or it can freely choose its preferred precoder matrix if no restrictions have been imposed by the eNB. Next, in the same interval the user can determine another precoder matrix $\hat{V}_1$ and corresponding SINRs using SU-MIMO rules. The eNB can set a separate restriction on rank or codebook subset which $\hat{V}_1$ may obey. Notice in this case that if the rank enforced on $\hat{V}_1$ happens to be equal to that of $\hat{G}_1$, then $\hat{V}_1$ and its corresponding quantized SINRs need not be reported since they are identical to d, and its corresponding quantized SINRs, respectively, since both the pairs are determined using SU-MIMO rules. Alternatively, the rank of precoder $\hat{V}_1$ can itself be a function of the rank of $\hat{G}_1$. The function is pre-defined and known to both the user and the eNB. An example rule is where rank of $\hat{V}_1$ may be equal to one when the rank of $\hat{G}_1$ is one; and the rank of $\hat{V}_1$ is two otherwise. In either case, using $\hat{V}_1$ along with the corresponding SINRs, the user determines the eNB configured residual error feedback form. The user feedback report now includes $\hat{G}_1$ and corresponding quantized SINRs as well as $\hat{V}_1$, its corresponding quantized SINRs and the residual error feedback form. Again, differential feedback can be exploited in reporting this CSI.

Alternatively, $\hat{V}_1$ itself can be a function of $\hat{G}_1$ and the SINRs corresponding to $\hat{G}_1$ and thus need not be reported since the function is pre-defined and known to both the user and the eNB. For instance, $\hat{V}_1$ can be the column of $\hat{G}_1$ for which the corresponding SINR is the largest among all SINRs corresponding to $\hat{G}_1$. Note here that if $\hat{V}_1$ is identical to $\hat{G}_1$ then even the quantized SINRs corresponding to $\hat{V}_1$ need not be reported since they are identical, respectively, to the quantized SINRs corresponding to $\tilde{G}_1$.

Finally, as an option to reduce feedback overhead, in all the aforementioned alternatives the CSI reports can include wideband $\hat{G}_1$, $\hat{V}_1$ along with sub-band specific SINRs and sub-band specific residual error feedback forms.

6 Appendix: Further Overhead Reduction in Signaling Enhanced User CSI Feedback

Let us consider the case when the residual error feedback form consists of only the quantized normalized residual error norm. In this case in each interval of the sequence designated for enhanced feedback, in all the aforementioned alternatives, the CSI reports can include a wideband $\hat{G}_1$ which is common for all subbands, a wideband $\hat{V}_1$ (if it is distinct from the reported $\hat{G}_1$) along with sub-band specific SINRs computed for $\hat{G}_1$ (and $\hat{V}_1$ if it is distinct from the reported $\hat{G}_1$) and a quantized wideband normalized residual error norm. The wideband normalized residual error norm is computed using time wideband $\hat{V}_1$. Alternatively, the CSI reports can include per-subband $\hat{G}_1$ (one for each subband), along with sub-band specific SINRs computed for $\hat{G}_1$ and a quantized wideband normalized residual error norm. The wideband normalized residual error norm is now computed using the per-subband $\hat{G}_1$.

In either one of the above two cases the computation of the wideband normalized residual error norm can be done as follows. The user can first determine a normalized residual error norm for each subband using either the wideband $\hat{V}_1$ or the corresponding per-subband $\hat{G}_1$, respectively. The computation of the wideband normalized residual error norm can be done using the computed subband specific normalized residual error norm (NREN) and one of the following options:—

The user can set the wideband MIEN to be equal to the average of its per-subband NRENs The user can set the wideband NREN to be equal to the best or smallest NREN among its per-subband NRENs The user can set the wideband NREN to be equal to the worst or largest NREN among its per-subband NRENs Alternatively, using the sub-band specific SINRs computed for $\hat{G}_1$, the user can determine the M subbands which offer the M largest rates (where the rates arc determined using the corresponding per subband SINRs). It then computes a normalized residual error norm for each one of these M subbands using either the wideband $\hat{V}_1$ or the corresponding per-subband $\hat{G}_1$, respectively. A wideband NREN can be determined using these M NRENs using any one of the three methods described above. Note that the value of M is configured by the eNB and conveyed to the user in a slow semi-static manner and can be user-specific. Notice that the computed wideband NREN may he quantized.

As noted previously the user can instead report the difference of the NREN and another scalar quantity (such as CQI)

which is also reported. It can instead report the ratio. The eNB may of course be aware of the reporting method being adopted. A useful observation is that a relatively large value of the NREN means that a significant portion of the channel energy remains in the orthogonal complement of the corresponding reported precoder. This implies that significant interference can potentially he caused to such a user if it is co-scheduled with one or more other users. Thus, it is sensible to not co-schedule such a user with other users and instead ensure that any RB allocated to such a user is not assigned to any other user. This observation can be leveraged by letting the user compare the computed NREN with a threshold. If the NREN is smaller than the threshold, it can be quantized and reported. Otherwise, if the NREN is larger than the threshold, a special value can be reported to the eNB instead of the quantized NREN, which will convey to the eNB that there is a "high possibility of co-scheduling interference" to the user on the one or more subbands covered by that NREN. The threshold is configured by the eNB and conveyed to the user in a slow semi-static manner and can be user-specific.

TABLE C6

Simulation Parameters: Heterogeneous network with low power RRHs within the macro-cell coverage

| Parameter | Assumption |
|---|---|
| Deployment scenario | Scenario 3: Heterogeneous network with low power RRHs within the macrocell coverage - 1 cell with 2 low-power nodes (LPNs) ITU UMa for Macro, UMi for low power node |
| Duplex method and bandwidth | FDD: 10 MHz for downlink |
| Cell layout | Hex grid 19 sites, 3 cells/site |
| Antenna Height | Macro: 25 m; LPN: 10 m |
| Number of users per sector | Config4b: 30 |
| Network synchronization | Synchronized |
| UE noise figure | 9 dB |
| Minimum Distance | Macro - RRH/Hotzone: >75 m<br>Macro - UE: >35 m<br>RRH/Hotzone - RRH/Hotzone: >40 m<br>RRH/Hotzone - UE: >10 m |
| Handover margin | 1 dB |
| Indoor-outdoor modeling | 100% of users are dropped outdoor |
| Antenna configuration (eNB) | 4 TX co-pol. ant., 0.5-λ spacing for both Macro Cell and LPN |
| Antenna configuration (user) | 2 RX co-pol. ant., 0.5-λ spacing |
| Antenna pattern | For macro eNB: 3D, tilt 12 degree. For low-power node: 2D |
| Downlink transmission scheme | SU-MIMO: Each user can have rank 1 or 2<br>MU-MIMO: Max 2 users/RB; Each user can have rank 1 |
| Codebook | Rel. 8 codebook |
| Downlink scheduler | PF in time and frequency |
| Scheduling granularity: | 5 RBs |
| Feedback assumptions | 5 ms periodicity and 4 ms delay; Sub-band CQI and PMI feedback without errors. |
| Sub-band granularity: | 5 RBs |
| Downlink HARQ scheme | Chase Combining |
| Downlink receiver type | LMMSE |
| Channel estimation error | NA |
| Feedback channel error | NA |
| Control channel and reference signal overhead | 3 OFDM symbols for control; Used TBS tables in TS 36.213 |

TABLE C7

Spectral efficiency of SU-MIMO/MU-MIMO in Heterogenous Networks; For MU-MIMO Rank-1 codebook restriction is imposed on all users and enhanced feedback is obtained from all users.

| MU-MIMO/SU-MIMO | Average Cell SE | 5% Cell-edge |
|---|---|---|
| SU-MIMO Overall | 2.8621 | 0.078 |
| SU-MIMO Macro-cell | 2.2025 | 0.0622 |
| SU-MIMO LPN-RRH | 3.1919 | 0.0904 |
| MU-MIMO Overall | 3.1526 (10.15%, 5.59%) | 0.0813 |
| MU-MIMO Macro-cell | 2.5322 (14.97%, 8.54%) | 0.0721 |
| MU-MIMO LPN-RRH | 3.4628 (8.49%, 4.91%) | 0.1036 |

Relative percentage gains are over SU-MIMO and MU-MIMO without enhanced feedback, respectively.

The invention claimed is:

1. A method implemented in a user equipment configured to be used in a multi-user (MU) multiple-input multiple-output (MIMO) wireless communications system, the method comprising:
transmitting to a base station a first channel state information (CSI) report determined according to a single-user (SU) MIMO rule; and
transmitting to the base station a second CSI report based on a residual error,
wherein the second CSI report includes an indication or a quantized value of a dominant diagonal value of $R_1$ along with a corresponding column in $Q_1$ where $Q_1$ is a semi-unitary matrix whose columns lie in the orthogonal complement of $\hat{V}_1$, $\hat{V}_1$ being a semi-unitary matrix whose columns represent preferred channel directions, and $R_1$ is a matrix which satisfies the Frobenius-norm constraint $\|R_1\|_F^2 \leq \epsilon_1^2$, $\epsilon_1$ being the residual error norm.

2. The method of claim 1, wherein the first CSI report is transmitted in a first interval configured for SU CSI reporting and the second CSI report is transmitted in a second interval configured for the second CSI report.

3. The method of claim 1, wherein the first CSI report and the second CSI report are transmitted in a common interval configured for CSI reporting.

4. The method of claim 1, wherein the first CSI report is transmitted in a first interval configured for SU CSI reporting and the first CSI report and the second CSI report are transmitted in a second interval configured for combined CSI reporting.

5. The method of claim 1, further comprising:
receiving at least one of sequence configuration information and sub-sequence configuration information from the base station,
wherein the sequence configuration information comprises at least one of first periodicity and first offset for the first CSI report, and
wherein the sub-sequence configuration information comprises at least one of second periodicity and second offset for the second CSI report.

6. The method of claim 1, wherein the first CSI report includes at least one of a preferred rank, a precoder of the preferred rank, and a corresponding quantized SINR (signal to interference plus noise ratio).

7. The method of claim 1, further comprising:
assuming a post scheduling model.

8. The method of claim 7, wherein the post scheduling model can be expressed as $$y_1 = \hat{D}_1^{1/2} \hat{V}_1^\dagger U_1 s_1 + \hat{D}_1^{1/2}(\hat{V}_1^\dagger + R_1^\dagger Q_1^\dagger) U_{\bar{T}} s_{\bar{T}} + \eta_1$$

where $y_1$ represents an N×1 received signal vector on a representative resource element in a resource block (RB), N being the number of receive antennas at the user equipment, $\hat{D}_1^{1/2}$ is a diagonal matrix of effective channel gains, $\hat{V}_1$ denotes a semi-unitary matrix whose columns represent preferred channel directions and $\hat{V}_1^\dagger$ represents Hermitian of $\hat{V}_1$, $U_1$ and $U_T$ represent precoding matrices used by the base station to transmit data to the user equipment and a co-scheduled user equipment, respectively, $s_1$ and $s_T$ represent transmit symbol vectors intended for the user equipment and the co-scheduled user equipment, respectively, $Q_1$ is a semi-unitary matrix whose columns lie in the orthogonal complement of $\hat{V}_1$, and $R_1$ is a matrix which satisfies the Frobenius-norm constraint $\|R_1\|_F^2 \le \epsilon_1^2$, $\epsilon_1$ being the residual error, and $\eta_1$ represents an additive noise vector.

9. The method of claim 8, wherein $Q_1^\dagger \hat{V}_1 = 0$.

10. The method of claim 1, further comprising:
receiving residual error form configuration information from the base station.

11. The method of claim 1, wherein the second CSI report comprises an enhancement to the first CSI report.

12. The method of claim 1, wherein the second CSI report includes an indication of residual error norm.

13. The method of claim 12, wherein the residual error norm can be expressed as $$\epsilon_1 = \sqrt{tr(F_1 H_1^\dagger P_1 H_1 F_1^\dagger \tilde{D}_1^{-1})}$$

where tr(.) denotes a trace operation, $F_1 H_1^\dagger$ denotes a filtered user channel, and $P_1 = (I - \hat{V}_1 \hat{V}_1^\dagger)$ is a projection matrix, $\hat{V}_1$ being a precoding matrix of rank $r_1$, and $\tilde{D}_1 = \text{diag}\{\text{SI}\hat{N}R_1^1, \ldots, \text{SI}\hat{N}R_1^{r_1}\}$, $\{\text{SI}\hat{N}R_1^i\}_{i=1}^{r_1}$ being $r_1$ quantized signal to interference plus noise ratios (SINRs).

14. The method of claim 1, wherein the second CSI report includes an indication or an approximation of at least one of a residual error matrix and a residual error correlation matrix.

15. The method of claim 1, wherein the second CSI report includes an indication or a quantized value of at least one of a diagonal value of $C_1$ and a trace of $C_1$, where $$C_1 = F_1 H_1^\dagger P_1 H_1 F_1^\dagger \tilde{D}_1^{-1},$$

$F_1 H_1^\dagger$ denotes a filtered user channel, and $P_1 = (I - \hat{V}_1 \hat{V}_1^\dagger)$ is a projection matrix, $\hat{V}_1$ being a precoding matrix of rank $r_1$, and $\tilde{D}_1 = \text{diag}\{\text{SI}\hat{N}R_1^1, \ldots, \text{SI}\hat{N}R_1^{r_1}\}$, $\{\text{SI}\hat{N}R_1^i\}_{i=1}^{r_1}$ being $r_1$ quantized signal to interference plus noise ratios (SINRs).

16. A multi-user (MU) multiple-input multiple-output (MIMO) wireless communications system, comprising:
a base station; and
a user equipment,
wherein the user equipment transmits to the base station a first channel state information (CSI) report determined according to a single-user (SU) MIMO rule, and a second CSI report based on a residual error,
wherein the second CSI report includes an indication or a quantized value of a dominant diagonal value of $R_1$ along with a corresponding column in $Q_1$ where $Q_1$ is a semi-unitary matrix whose columns lie in the orthogonal complement of $\hat{V}_1$, $\hat{V}_1$ being a semi-unitary matrix whose columns represent preferred channel directions, and $R_1$ is a matrix which satisfies the Frobenius-norm constraint $\|R_1\|_F^2 \le \epsilon_1^2$, $\epsilon_1$ being the residual error norm.

17. A method implemented in a base station configured to be used in a multi-user (MU) multiple-input multiple-output (MIMO) wireless communications system, the method comprising:
receiving from a user equipment a first channel state information (CSI) report determined according to a single-user (SU) MIMO rule; and
receiving from the user equipment a second CSI report based on a residual error,
wherein the second CSI report includes an indication or a quantized value of a dominant diagonal value of $R_1$ along with a corresponding column in $Q_1$ where $Q_1$ is a semi-unitary matrix whose columns lie in the orthogonal complement of $\hat{V}_1$, $\hat{V}_1$ being a semi-unitary matrix whose columns represent preferred channel directions, and $R_1$ is a matrix which satisfies the Frobenius-norm constraint $\|R_1\|_F^2 \le \epsilon_1^2$, $\epsilon_1$ being the residual error norm.

* * * * *